US011286338B2

(12) United States Patent
Rhodes et al.

(10) Patent No.: US 11,286,338 B2
(45) Date of Patent: *Mar. 29, 2022

(54) TWO COMPONENT MASS POLYMERIZABLE COMPOSITIONS CONTAINING POLYCYCLOOLEFIN MONOMERS AND ORGANORUTHENIUM CARBIDE PRECATALYST

(71) Applicant: PROMERUS, LLC, Brecksville, OH (US)

(72) Inventors: Larry F Rhodes, Brecksville, OH (US); Oleksandr Burtovyy, Brecksville, OH (US)

(73) Assignee: PROMERUS, LLC, Akron, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/024,760

(22) Filed: Sep. 18, 2020

(65) Prior Publication Data

US 2021/0079156 A1    Mar. 18, 2021

Related U.S. Application Data

(60) Provisional application No. 62/901,853, filed on Sep. 18, 2019.

(51) Int. Cl.
| | | |
|---|---|---|
| C08F 2/46 | (2006.01) | |
| C08F 2/50 | (2006.01) | |
| C08G 61/04 | (2006.01) | |
| C08G 61/02 | (2006.01) | |
| C08K 5/45 | (2006.01) | |
| C08K 5/02 | (2006.01) | |
| C08K 5/375 | (2006.01) | |
| B01J 31/22 | (2006.01) | |
| B33Y 70/00 | (2020.01) | |
| B33Y 80/00 | (2015.01) | |

(52) U.S. Cl.
CPC .......... *C08G 61/02* (2013.01); *B01J 31/2265* (2013.01); *C08K 5/02* (2013.01); *C08K 5/375* (2013.01); *C08K 5/45* (2013.01); *B01J 2231/543* (2013.01); *B01J 2531/821* (2013.01); *B33Y 70/00* (2014.12); *B33Y 80/00* (2014.12); *C08G 2261/148* (2013.01); *C08G 2261/1424* (2013.01); *C08G 2261/1426* (2013.01); *C08G 2261/3327* (2013.01); *C08G 2261/418* (2013.01)

(58) Field of Classification Search
CPC .............. C08F 2/46; C08F 2/50; C08G 61/04

USPC ........... 522/53, 49, 6, 71, 189, 184, 1; 520/1
See application file for complete search history.

(56) References Cited

U.S. PATENT DOCUMENTS

| | | | |
|---|---|---|---|
| 9,909,022 B2 | 3/2018 | Jain et al. | |
| 2014/0099573 A1* | 4/2014 | Weitekamp | ............... G03F 7/20 |
| | | | 430/18 |
| 2019/0048130 A1* | 2/2019 | Rhodes | ................ B01J 31/2278 |
| 2021/0079133 A1* | 3/2021 | Rhodes | .................. C08G 61/08 |

FOREIGN PATENT DOCUMENTS

| | | | | |
|---|---|---|---|---|
| JP | 2014177568 | * | 9/2014 | |
| WO | WO-2016063282 A1 * | 4/2016 | ............. C08G 61/08 |
| WO | WO2017/068590 A1 | 4/2017 | | |

OTHER PUBLICATIONS

Mizuki, JP 2014177568 Machine Translation, Sep. 25, 2014 (Year: 2014).*
Khalimon et al, Photogeneration of a Phosphnium Alkylidene Olefin Metathesis Catalyst, Oraganometallics, 2012, 31, 5634-5637 (Year: 2012).*
Andrey Y. Khalimon, et al., "Photogeneration of a Phosphonium Alkylidene Olefin Metathesis Catalyst," Organometallics, 2012, vol. 31, pp. 5634-5637.
Robert G. Carlson, et al., "The Metathesis-Facilitated Synthesis of Terminal Ruthenium Carbide Complexes: A Unique Carbon Atom Transfer Reaction," J. Am. Chem. Soc., 2002, vol. 124, pp. 1580-1581.
John R. Tumbleston, et al., "Continuous Liquid Interface Production of 3D Objects," Science, 2015, vol. 347, pp. 1349-1352.

* cited by examiner

*Primary Examiner* — Jessica Whiteley
(74) *Attorney, Agent, or Firm* — Balaram Gupta

(57) ABSTRACT

Embodiments in accordance with the present invention encompass a two component composition containing in one component a latent organo-ruthenium carbide catalyst, and in another component a photoactive acid generator or a thermally active acid generator, and either of the components containing a mixture of photoactive compound along with one or more monomers which undergo ring open metathesis polymerization (ROMP) when said components are mixed together and exposed to a suitable radiation (or heat) to form a three-dimensional (3D) object. The three-dimensional objects so formed exhibits improved mechanical properties, particularly, high heat distortion temperature, impact strength, elongation to break, among others. Accordingly, compositions of this invention are useful as 3D inkjet materials for forming high impact strength objects of various sizes with microscale features lower than 100 microns, among various other uses.

20 Claims, 1 Drawing Sheet

TWO COMPONENT MASS POLYMERIZABLE COMPOSITIONS CONTAINING POLYCYCLOOLEFIN MONOMERS AND ORGANORUTHENIUM CARBIDE PRECATALYST

CROSS REFERENCE TO RELATED APPLICATIONS

This application claims the benefit of U.S. Provisional Application No. 62/901,853, filed Sep. 18, 2019, which is incorporated herein by reference in its entirety.

BACKGROUND OF THE INVENTION

Field of the Invention

Embodiments in accordance with the present invention relate generally to a two component composition containing in two separate parts a mass polymerizable polycycloolefin monomer(s), an organoruthenium carbide precatalyst and an activator which when mixed together and subjected to photolytic or thermolytic conditions forms three dimensional (3D) objects, which are useful in 3D printing materials, among other uses. The two component compositions so formed are stable at ambient conditions and when mixed and photolyzed (or thermolyzed) form solid objects which exhibit high mechanical properties, specifically, high impact strength and high elongation to break. Thus compositions of this invention find utility in a variety of applications including as 3D ink compositions, among others. More specifically, this invention relates to room temperature stable two component compositions encompassing norbornene (NB) and dicyclopentadiene (DCPD) based olefinic monomers and an organoruthenium carbide catalyst system which is activated under photolytic (or thermolytic) conditions thereby undergoing mass polymerization to form solid objects, including films, vias, patterned lines, including photo-patterned images, among others.

Description of the Art

Recently there has been an increased interest in developing 3D ink compositions which can produce 3D objects having finer structures at micron levels. A few of the recently introduced 3D ink systems are capable of continuous production of 3D objects which are useful in a variety of diversified applications including for example tissue engineering to electronic components. See for example, J. M. DeSimone et al., Science, Vol. 347, pp 1349-1352 (2015), where it is disclosed a continuous liquid interface production (CLIP), which is controlled by a "dead zone" to avoid any oxygen sensitivity of the 3D ink materials employed therein, which allows fabrication of a series of objects at much faster speed and with high resolution such that the objects so formed can feature patterns in the 50 to 100 micron range.

WO2017/068590 A1 discloses a series of 3D inkjet printing materials using dicyclopentadiene compounds polymerizable by ring-opening metathesis polymerization methods.

U.S. Pat. No. 9,909,022 B2 discloses various ink compositions which when printed and cured forms organic thin films on a substrate. Such ink compositions are contemplated to be used in organic light emitting diode (OLED) displays. The compositions disclosed therein are generally curable polyethylene glycol acrylates and polyol acrylates, which are known to be unstable at temperatures higher than 200° C.

Piers, et al., Organometallics 2012, 31, 5634-5637, have shown that certain of the ruthenium carbide catalysts are active for ring open metathesis polymerization of certain cycloalkenes. However, such reactions are carried out in a solvent, and are thus not suitable as 3D ink materials for mass polymerization conditions.

Accordingly, there is still a need for developing 3D printing materials that can be cured at a faster speed and exhibit desirable thermal and mechanical properties for fabricating industrially useful 3D objects, films and patterned features at a lower cost, especially stable at temperatures higher than 200° C.

Thus, it is an object of this invention to provide 3D printing compositions that overcome the gaps faced by the art. More specifically, it is an object of this invention to provide a two component composition that will mass polymerize rapidly when mixed together and photolyzed (or subject to thermolytic conditions) under inert atmospheres to form 3D objects under the conditions of 3D printing system. It is further an object of this invention to provide stable two component mass polymerizable composition with no change in viscosity at or below normal storage conditions but which undergoes mass polymerization only when mixed together under the 3D process conditions.

Other objects and further scope of the applicability of the present invention will become apparent from the detailed description that follows.

SUMMARY OF THE INVENTION

Surprisingly, it has now been found that by employing a two component filler composition, it is now possible to form three dimensional objects having improved thermal and mechanical properties, most notably, the two component compositions of this invention can be tailored to desirable thermo-mechanical properties. For example, the compositions of this invention can be tailored to exhibit glass transition temperatures ($T_g$) higher than 150° C., high heat distortion temperature (HDT, higher than 50° C. at 1.82 MPa/264 psi), high elongation to break (greater than 100 percent), high impact strength (Izod impact strength of about 50 J/m or higher) and high tensile strength (greater than 50 MPa). It is also important to note that the compositions of this invention can be mass polymerized under photolytic conditions at a faster speed and thus can be employed in any of the 3D technologies, including layer by layer approach, inkjet formulations and in the stereolithographic applications involving continuous liquid interface production of 3D objects. The compositions of this invention are expected to exhibit faster photopolymerizing capabilities thus enabling to form a wide variety of objects of different sizes, including sizes greater than 10 inches and structural details lower than 50 µm. Further, compositions of this invention are also expected to exhibit low shrinkage due to their rigid polycycloolefinic structure. In addition, as the components of this invention undergo fast mass polymerization upon application they do not leave behind any fugitive small molecules which needs further processing. Generally, no other small molecule additives need to be employed thus offering additional advantages. Most importantly, the two component compositions of this invention are stable (i. e., no change in viscosity) at ambient atmospheric conditions including up to 35° C. for several days, and undergo mass polymerization only when mixed together under photolytic conditions.

In another aspect of this invention there is also provided a kit encompassing the two component composition of this invention for forming a three dimensional object.

BRIEF DESCRIPTION OF THE DRAWINGS

Embodiments in accordance with the present invention are described below with reference to the following accompanying figures and/or images. Where drawings are provided, it will be drawings which are simplified portions of various embodiments of this invention and are provided for illustrative purposes only.

FIG. 1A—20 µm and FIG. 1B—10 µm.

FIG. 1A—20 µm and FIG. 1B—10 µm, which are identical replica of the patterned surface of a DVD.

DETAILED DESCRIPTION

Figure 1A:
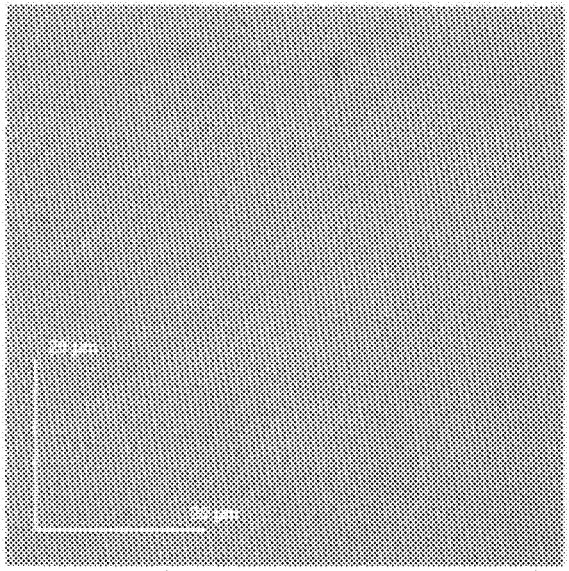
FIGS. 1A and 1B show optical micrographs of different resolutions of typical patterned surface of a conventional digital video disk (DVD)

The terms as used herein have the following meanings:

As used herein, the articles "a," "an," and "the" include plural referents unless otherwise expressly and unequivocally limited to one referent.

Since all numbers, values and/or expressions referring to quantities of ingredients, reaction conditions, etc., used herein and in the claims appended hereto, are subject to the various uncertainties of measurement encountered in obtaining such values, unless otherwise indicated, all are to be understood as modified in all instances by the term "about."

Where a numerical range is disclosed herein such range is continuous, inclusive of both the minimum and maximum values of the range as well as every value between such minimum and maximum values. Still further, where a range refers to integers, every integer between the minimum and maximum values of such range is included. In addition, where multiple ranges are provided to describe a feature or characteristic, such ranges can be combined. That is to say that, unless otherwise indicated, all ranges disclosed herein are to be understood to encompass any and all sub-ranges subsumed therein. For example, a stated range of from "1 to 10" should be considered to include any and all sub-ranges between the minimum value of 1 and the maximum value of 10. Exemplary sub-ranges of the range 1 to 10 include, but are not limited to, 1 to 6.1, 3.5 to 7.8, and 5.5 to 10, etc.

As used herein, the expression "alkyl" means a saturated, straight-chain or branched-chain hydrocarbon substituent having the specified number of carbon atoms. Particular alkyl groups are methyl, ethyl, n-propyl, isopropyl, tert-butyl, and so on. Derived expressions such as "alkoxy", "thioalkyl", "alkoxyalkyl", "hydroxyalkyl", "alkylcarbonyl", "alkoxycarbonylalkyl", "alkoxycarbonyl", "diphenylalkyl", "phenylalkyl", "phenylcarboxyalkyl" and "phenoxyalkyl" are to be construed accordingly.

As used herein, the expression "cycloalkyl" includes all of the known cyclic groups. Representative examples of "cycloalkyl" includes without any limitation cyclopropyl, cyclobutyl, cyclopentyl, cyclohexyl, cycloheptyl, cyclooctyl, and the like. Derived expressions such as "cycloalkoxy", "cycloalkylalkyl", "cycloalkylaryl", "cycloalkylcarbonyl" are to be construed accordingly.

As used herein, the expression "perhaloalkyl" represents the alkyl, as defined above, wherein all of the hydrogen atoms in said alkyl group are replaced with halogen atoms selected from fluorine, chlorine, bromine or iodine. Illustrative examples include trifluoromethyl, trichloromethyl, tribromomethyl, triiodomethyl, pentafluoroethyl, pentachloroethyl, pentabromoethyl, pentaiodoethyl, and straight-chained or branched heptafluoropropyl, heptachloropropyl, heptabromopropyl, nonafluorobutyl, nonachlorobutyl, undecafluoropentyl, undecachloropentyl, tridecafluorohexyl, tridecachlorohexyl, and the like. Derived expression, "perhaloalkoxy", is to be construed accordingly. It should further be noted that certain of the alkyl groups as described herein, such as for example, "alkyl" may partially be fluorinated, that is, only portions of the hydrogen atoms in said alkyl group are replaced with fluorine atoms and shall be construed accordingly.

As used herein the expression "acyl" shall have the same meaning as "alkanoyl", which can also be represented structurally as "R—CO—," where R is an "alkyl" as defined herein having the specified number of carbon atoms. Additionally, "alkylcarbonyl" shall mean same as "acyl" as defined herein. Specifically, "($C_1$-$C_4$)acyl" shall mean formyl, acetyl or ethanoyl, propanoyl, n-butanoyl, etc. Derived expressions such as "acyloxy" and "acyloxyalkyl" are to be construed accordingly.

As used herein, the expression "aryl" means substituted or unsubstituted phenyl or naphthyl. Specific examples of substituted phenyl or naphthyl include o-, p-, m-tolyl, 1,2-, 1,3-, 1,4-xylyl, 1-methylnaphthyl, 2-methylnaphthyl, etc. "Substituted phenyl" or "substituted naphthyl" also include any of the possible substituents as further defined herein or one known in the art.

As used herein, the expression "arylalkyl" means that the aryl as defined herein is further attached to alkyl as defined herein. Representative examples include benzyl, phenylethyl, 2-phenylpropyl, 1-naphthylmethyl, 2-naphthylmethyl and the like.

As used herein, the expression "alkenyl" means a non-cyclic, straight or branched hydrocarbon chain having the specified number of carbon atoms and containing at least one carbon-carbon double bond, and includes ethenyl and straight-chained or branched propenyl, butenyl, pentenyl and hexenyl groups. Derived expression, "arylalkenyl" and five membered or six membered "heteroarylalkenyl" is to be construed accordingly. Illustrative examples of such derived expressions include furan-2-ethenyl, phenylethenyl, 4-methoxyphenylethenyl, and the like.

As used herein, the expression "heteroaryl" includes all of the known heteroatom containing aromatic radicals. Representative 5-membered heteroaryl radicals include furanyl, thienyl or thiophenyl, pyrrolyl, isopyrrolyl, pyrazolyl, imidazolyl, oxazolyl, thiazolyl, isothiazolyl, and the like. Representative 6-membered heteroaryl radicals include pyridinyl, pyridazinyl, pyrimidinyl, pyrazinyl, triazinyl, and the like radicals. Representative examples of bicyclic heteroaryl radicals include, benzofuranyl, benzothiophenyl, indolyl, quinolinyl, isoquinolinyl, cinnolyl, benzimidazolyl, indazolyl, pyridofuranyl, pyridothienyl, and the like radicals.

"Halogen" or "halo" means chloro, fluoro, bromo, and iodo.

In a broad sense, the term "substituted" is contemplated to include all permissible substituents of organic compounds. In a few of the specific embodiments as disclosed herein, the term "substituted" means substituted with one or more substituents independently selected from the group consisting of ($C_1$-$C_6$)alkyl, ($C_2$-$C_6$)alkenyl, ($C_1$-$C_6$)perfluoroalkyl, phenyl, hydroxy, —$CO_2H$, an ester, an amide, ($C_1$-$C_6$) alkoxy, ($C_1$-$C_6$)thioalkyl and ($C_1$-$C_6$)perfluoroalkoxy. However, any of the other suitable substituents known to one skilled in the art can also be used in these embodiments.

It should be noted that any atom with unsatisfied valences in the text, schemes, examples and tables herein is assumed to have the appropriate number of hydrogen atom(s) to satisfy such valences.

By the term "latent organo-ruthenium carbide catalyst" is meant organo-ruthenium carbide compounds that show little or no catalytic activity at a particular (usually ambient atmospheric conditions) temperature and initiate such activity upon exposure to suitable radiation.

By the term "three dimensional object" or "3D object" means any of the macroscale or microscale objects that can be formed from the compositions of this invention by any of the known techniques having a wide variety of applications including electronic, optoelectronic, and other applications.

By the term "derived" is meant that the polymeric repeating units are polymerized (formed) from, for example, polycyclic monomers, such as norbornene-type monomers in accordance with formulae (I) or (IV) wherein the resulting polymers are ring opened metathesis polymerized (ROMP), for example, the 2,3 double bond of norbornene-type monomers are ring opened and polymerized as shown below:

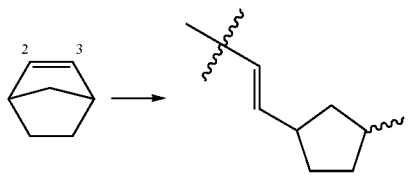

Accordingly, in accordance with the practice of this invention there is provided a two component composition comprising component A and component B, wherein component A contains a latent organo-ruthenium carbide catalyst and component B contains a photoactive or a thermoactive acid generator and either of the component A or the component B further comprising:

a) one or more monomers of formula (I):

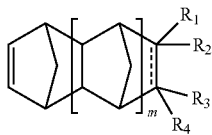

wherein:

m is an integer 0, 1 or 2;

═══ is a single bond or a double bond;

$R_1$, $R_2$, $R_3$ and $R_4$ are the same or different and each independently selected from the group consisting of hydrogen, halogen, methyl, ethyl, linear or branched $(C_3-C_{16})$alkyl, $(C_2-C_{16})$alkenyl, perfluoro$(C_1-C_{12})$alkyl, $(C_3-C_{12})$cycloalkyl, $(C_6-C_{12})$bicycloalkyl, $(C_7-C_{14})$tricycloalkyl, methoxy, ethoxy, linear or branched $(C_3-C_{16})$alkoxy, $(C_2-C_6)$acyl, $(C_2-C_6)$acyloxy, perfluoro$(C_6-C_{14})$aryl, perfluoro$(C_6-C_{14})$aryl$(C_1-C_3)$alkyl, $(C_6-C_{14})$aryloxy, $(C_6-C_{14})$aryl$(C_1-C_6)$alkoxy, tri$(C_1-C_6)$alkoxysilyl and a group of formula (A):

—Z-Aryl      (A)

wherein:

Z is a bond or a group selected from the group consisting of:

$(CR_5R_6)_a$, $O(CR_5R_6)_a$, $(CR_5R_6)_aO$, $(CR_5R_6)_a$—O—$(CR_5R_6)_b$, $(CR_5R_6)_a$—O—$(SiR_5R_6)_b$, $(CR_5R_6)_a$—(CO)O—$(CR_5R_6)_b$, $(CR_5R_6)_a$—O(CO)—$(CR_5R_6)_b$, $(CR_5R_6)_a$—(CO)—$(CR_5R_6)_b$, where a and b are integers which may be the same or different and each independently is 1 to 12;

$R_5$ and $R_6$ are the same or different and each independently selected from the group consisting of hydrogen, methyl ethyl, linear or branched $(C_3-C_6)$alkyl, methoxy, ethoxy, linear or branched $(C_3-C_6)$alkyloxy, $(C_2-C_6)$acyl, $(C_2-C_6)$acyloxy, phenyl and phenoxy;

Aryl is selected from the group consisting of phenyl, biphenyl and naphthyl, where the aryl is optionally substituted with one or more of groups selected from the group consisting of methyl, ethyl, linear or branched $(C_3-C_6)$alkyl, hydroxy, methoxy, ethoxy, linear or branched $(C_3-C_6)$alkyloxy, $(C_2-C_6)$acyl, $(C_2-C_6)$acyloxy, phenyl and phenoxy; or one of $R_1$ or $R_2$ taken together with one of $R_3$ or $R_4$ and the carbon atoms to which they are attached to form a $(C_5-C_7)$carbocyclic ring optionally containing one or more double bonds; and b) a photoactive compound; and wherein said latent organo-ruthenium carbide catalyst is of formula (II) or formula (III):

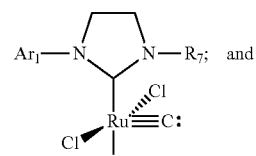

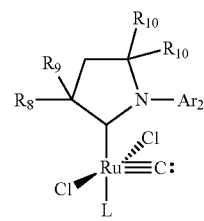

wherein:

L is $PR_3$, where R is independently selected from the group consisting of isopropyl, sec-butyl, tert-butyl, cyclohexyl, bicyclo$(C_5-C_{10})$alkyl, phenyl, benzyl, isopropoxy, sec-butoxy, tert-butoxy, cyclohexyloxy, phenoxy and benzyloxy;

$R_7$ is selected from the group consisting of methyl, ethyl, isopropyl, sec-butyl, tert-butyl, substituted or unsubstituted cyclohexyl, substituted or unsubstituted phenyl, substituted or unsubstituted biphenyl and substituted or unsubstituted naphthyl;

$R_8$ and $R_9$ are the same or different and each independently selected from the group consisting of hydrogen, methyl, ethyl, linear or branched $(C_1-C_6)$alkyl, $(C_6-C_{10})$aryl, methoxy, ethoxy, linear or branched $(C_1-C_6)$alkoxy, $(C_6-C_{10})$aryloxy, —NHCO$(C_1-C_6)$alkyl, —NHCO-perfluoro$(C_1-C_6)$alkyl, —SO$_2$N$((C_1-C_6)$alkyl$)_2$ and —NO$_2$; or $R_8$ and $R_9$ taken together with the carbon atom to which they are attached to form a $(C_3-C_7)$cycloalkyl ring;

each $R_{10}$ is independently selected from the group consisting of hydrogen, methyl, ethyl and linear or branched $(C_1-C_6)$alkyl;

$Ar_1$ and $Ar_2$ are the same or different and each independently selected from the group consisting of substituted or unsubstituted phenyl, substituted or unsubstituted biphenyl and substituted or unsubstituted naphthyl;

wherein said substituents are selected from the group consisting of methyl, ethyl, iso-propyl, tert-butyl and phenyl; and wherein said component A and component B are in a clear liquid form at room temperature.

As used herein the Aryl may further include the following:

substituted or unsubstituted biphenyl of formula:

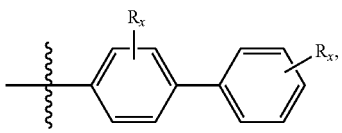

substituted or unsubstituted naphthyl of formula:

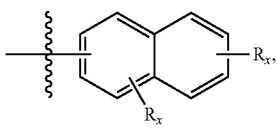

substituted or unsubstituted terphenyl of formula:

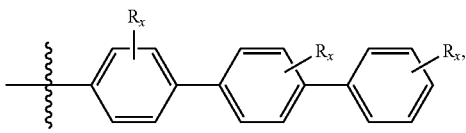

substituted or unsubstituted anthracenyl of formula:

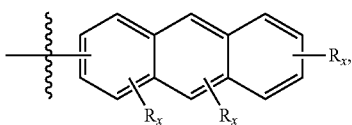

substituted or unsubstituted fluorenyl of formula:

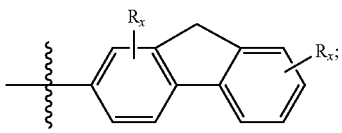

where $R_x$ in each occurrence is independently selected from methyl, ethyl, linear or branched $(C_3-C_{12})$alkyl or $(C_6-C_{10})$aryl.

The composition of this invention can contain additional types of cycloalkenes in either of component A or component B. Accordingly, in some embodiments, either of the component A or the component B of this invention further comprises one or more monomers of formula (IV):

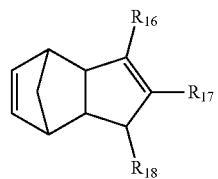

(IV)

wherein $R_{16}$ and $R_{17}$ are the same or different and each independently selected from the group consisting of hydrogen, methyl ethyl, linear or branched $(C_3-C_6)$alkyl, methoxy, ethoxy, linear or branched $(C_3-C_6)$alkyloxy, acetoxy, $(C_2-C_6)$acyl, phenyl and phenoxy; or $R_{16}$ taken together with $R_{17}$ and the carbon atoms to which they are attached to form a $(C_5-C_7)$carbocyclic ring optionally containing one or more double bonds;

$R_{18}$ is hydrogen, halogen, methyl, ethyl, linear or branched $(C_3-C_{16})$alkyl, $(C_6-C_{10})$aryl, $(C_6-C_{10})$aryl$(C_1-C_6)$alkyl, hydroxy, methoxy, ethoxy, linear or branched $(C_3-C_{16})$alkoxy, $(C_6-C_{10})$aryloxy, $(C_6-C_{10})$aryl$(C_1-C_6)$alkoxy, —O(CO)$R_{19}$ and —O(CO)O$R_{19}$, where $R_{19}$ is methyl, ethyl, linear or branched $(C_3-C_{16})$alkyl, $(C_6-C_{10})$aryl and $(C_6-C_{10})$aryl$(C_1-C_6)$alkyl.

Advantageously, it has further been found that the compositions of this invention can contain even further additional monomers. In some embodiments, the composition according to this invention may further contain one or more second monomer selected from the monomer of formula (VII).

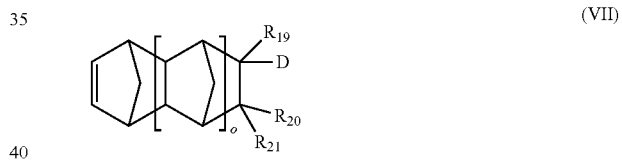

(VII)

wherein:

o is an integer from 0 to 2, inclusive;

D is $SiR_{22}R_{23}R_{24}$ or a group selected from:

$$—(CH_2)_c—O—SiR_{22}R_{23}R_{24} \qquad (E);$$

$$—(CH_2)_c—SiR_{22}R_{23}R_{24} \qquad (F); \text{ and}$$

$$—(SiR_{22}R_{23})_c—O—SiR_{22}R_{23}R_{24} \qquad (G); \text{ wherein}$$

c is an integer from 1 to 10, inclusive, and where one or more of $CH_2$ is optionally substituted with $(C_1-C_{10})$alkyl, $(C_1-C_{10})$perfluoroalkyl or $(C_6-C_{14})$aryl;

$R_{19}$, $R_{20}$ and $R_{21}$ are the same or different and independently of each other selected from hydrogen, halogen and hydrocarbyl, where hydrocarbyl is selected from methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$alkyl or $(C_6-C_{10})$aryloxy; and $R_{21}$, $R_{22}$ and $R_{23}$ are each independently of one another methyl, ethyl, linear or branched $(C_3-C_9)$alkyl, substituted or unsubstituted $(C_6-C_{14})$aryl, methoxy, ethoxy, linear or branched $(C_3-C_9)$alkoxy or substituted or unsubstituted $(C_6-C_{14})$aryloxy.

In this aspect of the invention, it has now been found that monomers of formula (VII) provides further advantages. Namely, the monomers of formula (VII) depending upon the nature of the monomer may impart high thermo-mechanical properties, thus it can be tailored to meet the need. In addition, the monomers of formula (VII) may exhibit low viscosity and good solubility for the latent catalyst and/or activator, among various other advantages.

Again, any amount of one or more monomers of formula (I) with one or more monomers of formula (IV) can be employed to form the compositions of this invention, and if necessary, one or more monomers of formula (VII). Accordingly, the combined molar ratio of monomers of formula (I) to monomers of formula (IV) can be from 1:99 to 99:1. In some embodiments, the molar ratio of monomers of formula (I):monomers of formula (IV) is in the range from 5:95 to 95:5; in some other embodiments it is from 10:90 to 90:10; it is from 20:80 to 80:20; it is from 30:70 to 70:30; it is from 60:40 to 40:60; and it is 50:50, and so on. Similarly, when more than one monomer of formula (I) and more than one monomer of formula (IV) are employed, any ratios of such monomers can be used that would bring about the intended result. Similarly, any amount of one or more monomers of formula (VII) can also be employed depending upon the intended benefit such monomers may afford.

All of the aforementioned monomers employed in the composition of this invention are themselves known in the literature or can be prepared by any of the known methods in the art to make such or similar types of monomers.

In addition, the monomers as described herein readily undergo mass polymerization, i.e., substantially in their neat form without use of any solvents when polymerized under mass ring open metathesis polymerization (ROMP) conditions using certain transition metal catalysts, such as for example, organo-ruthenium and organo-osmium compounds. See for example, R. H. Grubbs et al., *Handbook of Metathesis*, Ed.: Wiley-VCH, Weinheim, Germany, 2003, R. H. Grubbs et al., *Acc. Chem. Res.* 2001, 34, 18-29, R. H. Grubbs et al., Angew. *Chem. Int. Ed.,* 2006, 45, 3760-3765. Also, see U.S. Pat. No. 6,838,489, pertinent portions of which are incorporated herein by reference. The term "mass polymerization" as used herein shall have the generally accepted meaning in the art. That is, a polymerization reaction that is generally carried out substantially in the absence of a solvent. In some cases, however, a small proportion of solvent is present in the reaction medium. For example, such small amounts of solvent may be used to dissolve the latent catalyst and/or the activator, including photoactive (or thermoactive) acid generator or convey the same to the reaction medium. Also, some solvent may be used to reduce the viscosity of the monomer or to dissolve the monomer if it is in a solid form. In some cases the co-monomer, if employed, may itself serve as a solvent both to reduce the viscosity and/or to dissolve the co-monomer. The amount of solvent that can be used in the reaction medium may be in the range of 0 to 10 weight percent based on the total weight of the monomers employed or may be higher. In some embodiments the amount of solvent used is less than one weight percent based on the total weight of the monomers (or the total composition, including component A and B) employed. In some other embodiments the amount of solvent used is less than two weight percent based on the total weight of the monomers (or the total composition, including component A and B) employed. Any of the suitable solvents that dissolve the catalyst, activator and/or monomers can be employed in this invention. Examples of such solvents include alkanes, cycloalkane, toluene, THF, dichloromethane, dichloroethane, and the like.

Advantageously, it has now been found that one or more of the monomers themselves can be used to dissolve the latent catalyst as well as the activator and thus avoiding the need for the use of solvents. In addition, one monomer can itself serve as a solvent for the other monomer and thus eliminating the need for an additional solvent. For example, if first monomer of formula (I) is a solid at room temperature, then the second monomer of formula (I), which is liquid at room temperature can be used as a solvent for the first monomer of formula (I) which is a solid or vice versa. Therefore, in such situations more than one monomer can be employed in the composition of this invention.

Accordingly, it has now been surprisingly found that monomers of formula (I) serve as raw materials for fabricating a three dimensional (3D) objects using any of the known 3D technologies. In general, the composition of this invention exhibits low viscosity, which can be below 100 centipoise at 25° C. and in some embodiments below 50 centipoise (cP) at room temperature (i.e., around 25° C.). In some embodiments, the viscosity of the composition of this invention is less than 40 centipoise at 25° C. In some other embodiments the viscosity of the composition of this invention is in the range from about 10 to 40 centipoise at 25° C. In yet some other embodiments the viscosity of the composition of this invention is lower than 30 cP, lower than 20 cP, lower than 15 cP, lower than 12 cP at 25° C. In some embodiments it may be lower than 10 cP at 40° C. In some embodiments the viscosity of the composition of this invention is in the range from about 8 to 12 cP at 40° C. Accordingly, in some embodiments the composition according to this invention contains in either of the component A or the component B a first and a second monomer of formula (I) distinct from each other and one of said first and second monomers having a viscosity below 50 centipoise at 25° C., and wherein said first monomer is completely miscible with said second monomer to form a clear solution.

When the composition of this invention contains two or more monomers, for example, they can be present in any desirable amounts that would bring about the intended benefit, including viscosity modification or improvement in thermal and mechanical properties or both. Accordingly, the molar ratio of first monomer of formula (I) to second distinct monomer of formula (I) can be from 1:99 to 99:1. In some embodiments, the molar ratio of first monomer of formula (*second distinct monomer of formula (I) is in the range from 5:95 to 95:5; in some other embodiments it is from 10:90 to 90:10; it is from 20:80 to 80:20; it is from 30:70 to 70:30; it is from 60:40 to 40:60; and it is 50:50, and so on. Similarly, when more than two different monomers of formula (I) are employed, any ratios of such monomers can be used that would bring about the intended result.

In general, the compositions in accordance with the present invention encompass the above described one or more of the monomer of formula (I) and if needed additional monomers of formula (I) distinct from each other, or one or more monomers of formula (IV) or one or more monomers of formula (VII), as it will be seen below, various composition embodiments are selected to provide properties to such embodiments that are appropriate and desirable for the use for which such embodiments are directed, thus such embodiments are tailorable to a variety of specific applications.

For example, as already discussed above, proper combination of distinctive monomers of formula (I) makes it possible to tailor a composition having the desirable viscosity, thermal and mechanical properties. In addition, as described further herein it may be desirable to include other polymeric or monomeric materials as additives, such as for example inorganic nanoparticles which are compatible to provide desirable optical properties depending upon the end use application. Accordingly, the compositions of this invention can also include other polymeric materials and/or nanoparticles which will bring about such intended benefit. Examples of such polymers include without any limitation, polystyrene, poly(α-methylstyrene), poly(vinyl-toluene), copolymers of α-methylstyrene and vinyl-toluene, and the like. Other polymers that may be suitable as additives in the compositions of this invention include elastomeric polymers, including a wide variety of rubbers, both natural and synthetic rubber. Non-limiting examples of synthetic rubbers include polyisobutylene (PIB), polybutadiene, polyisoprene, random and block copolymers of butadiene and/or isoprene with styrene, styrene-butadiene rubbers (SBR), chloroprene rubbers, and the like. In some embodiments certain of these polymers and/or nanoparticles also function as viscosity modifiers depending upon the type of monomers employed. Accordingly, in some embodiments of this invention polystyrene is used as viscosity modifier.

The compositions in accordance with the present invention may further contain optional additives as may be useful for the purpose of improving properties of both the composition and the resulting object made therefrom. Such optional additives for example may include anti-oxidants and synergists. Any of the anti-oxidants that would bring about the intended benefit can be used in the compositions of this invention. Non-limiting examples of such antioxidants include pentaerythritol tetrakis(3-(3,5-di-tert-butyl-4-hydroxyphenyl)propionate) (IRGANOX™ 1010 from BASF), 3,5-bis(1,1-dimethylethyl)-4-hydroxy-octadecyl ester benzenepropanoic acid (IRGANOX™ 1076 from BASF) and thiodiethylene bis[3-(3,5-di-tert.-butyl-4-hydroxy-phenyl)propionate] (IRGANOX™ 1035 from BASF).

In some embodiments the composition according to this invention encompasses a monomer of formula (I) wherein m is 1 and each of $R_1$, $R_2$, $R_3$ and $R_4$ are hydrogen. In some other embodiments the composition according to this invention encompasses a monomer of formula (I) wherein m is 0 and at least one of $R_1$, $R_2$, $R_3$ and $R_4$ is other than hydrogen and is a group as defined above and the remaining $R_1$, $R_2$, $R_3$ and $R_4$ are hydrogen.

In some embodiments the composition according to this invention encompasses a monomer of formula (IV) where $R_{18}$ is hydrogen. In some embodiments the composition according to this invention encompasses a monomer of formula (IV) where $R_{18}$ is methyl, ethyl, n-propyl, iso-propyl, n-butyl, iso-butyl, tert-butyl, phenyl, benzyl, phenethyl, methoxy, ethoxy, phenoxy, benzyloxy, acetoxy and benzoyl.

In some embodiments the composition of this invention encompasses first and second monomer of formula (I) distinct from each other, wherein said first monomer is of formula (I) wherein m is 1 and each of $R_1$, $R_2$, $R_3$ and $R_4$ are hydrogen; and wherein said second monomer is of formula (I) wherein m is 0, $R_1$ is decyl and each of $R_2$, $R_3$ and $R_4$ are hydrogen.

Accordingly, any of the monomers within the scope of monomer of formula (I) can be employed in the composition of the invention. Representative examples of monomer of formula (I) include the following without any limitations:

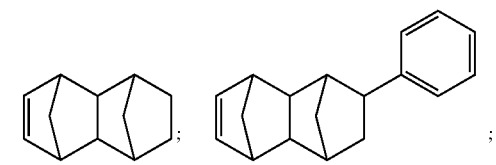

tetracyclododecene (TD)   2-phenyl-tetracyclododecene (PhTD)

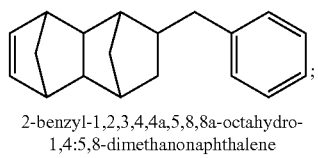

2-benzyl-1,2,3,4,4a,5,8,8a-octahydro-
1,4:5,8-dimethanonaphthalene

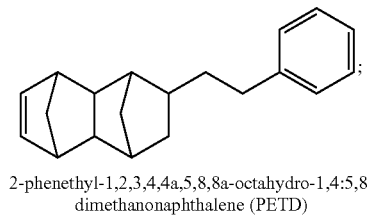

2-phenethyl-1,2,3,4,4a,5,8,8a-octahydro-1,4:5,8-
dimethanonaphthalene (PETD)

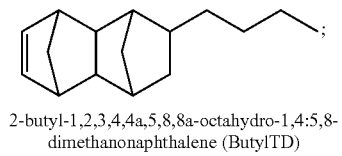

2-butyl-1,2,3,4,4a,5,8,8a-octahydro-1,4:5,8-
dimethanonaphthalene (ButylTD)

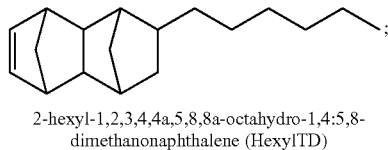

2-hexyl-1,2,3,4,4a,5,8,8a-octahydro-1,4:5,8-
dimethanonaphthalene (HexylTD)

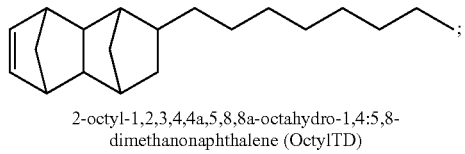

2-octyl-1,2,3,4,4a,5,8,8a-octahydro-1,4:5,8-
dimethanonaphthalene (OctylTD)

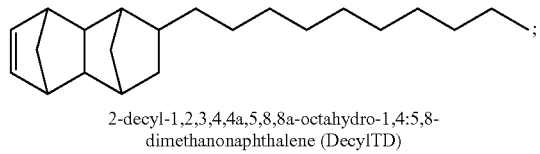

2-decyl-1,2,3,4,4a,5,8,8a-octahydro-1,4:5,8-
dimethanonaphthalene (DecylTD)

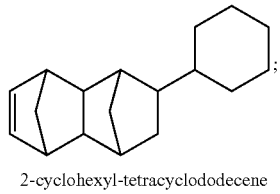

2-cyclohexyl-tetracyclododecene
(CyclohexylTD)

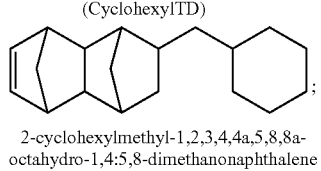

2-cyclohexylmethyl-1,2,3,4,4a,5,8,8a-
octahydro-1,4:5,8-dimethanonaphthalene

-continued

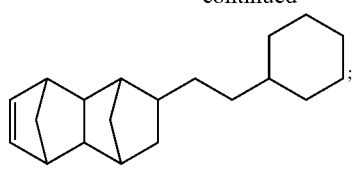

2-cyclohexylethyl-1,2,3,4,4a,5,8,8a-octahydro-
1,4:5,8-dimethanonaphthalene

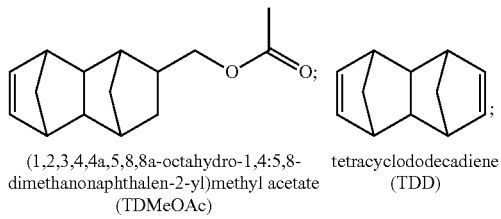

(1,2,3,4,4a,5,8,8a-octahydro-1,4:5,8-
dimethanonaphthalen-2-yl)methyl acetate
(TDMeOAc)

tetracyclododecadiene
(TDD)

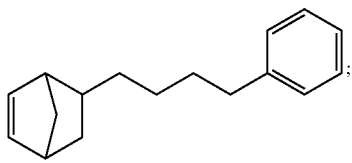

5-(4-phenylbutyl)bicyclo[2.2.1]hept-2-ene

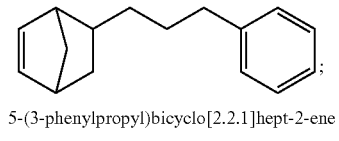

5-(3-phenylpropyl)bicyclo[2.2.1]hept-2-ene

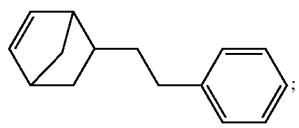

5-phenethylbicyclo[2.2.1]hept-2-ene
(PENB)

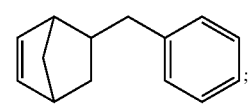

5-benzylbicyclo[2.2.1]hept-2-ene

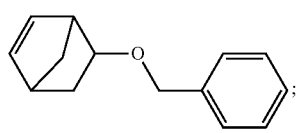

5-(benzyloxy)bicyclo[2.2.1]hept-2-ene

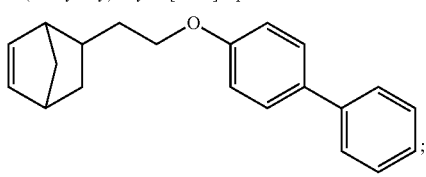

5-(2-([1,1′-biphenyl]-4-yloxy)ethyl)bicyclo
[2.2.1]hept-2-ene

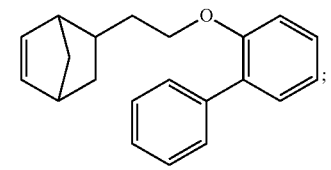

5-(2-([1,1′-biphenyl]-2-yloxy)ethyl)bicyclo
[2.2.1]hept-2-ene (NBEtO-2-PhPh)

-continued

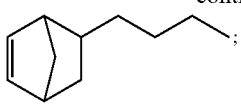

5-butylbicyclo[2.2.1]hept-2-ene
(BuNB)

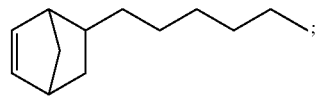

5-hexylbicyclo[2.2.1]hept-2-ene
(HexylNB)

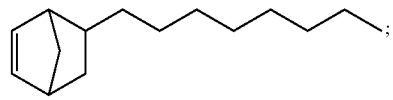

5-octylbicyclo[2.2.1]hept-2-ene (OctNB)

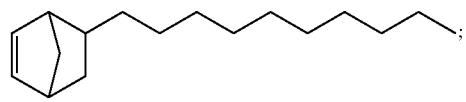

5-decylbicyclo[2.2.1]hept-2-ene (DecylNB)

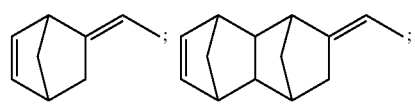

5-ethylidenebicyclo
[2.2.1]hept-2-ene 2-ethylidene-1,2,3,4,4a,5,8,8a-
octahydro-1,4:5,8-
dimethanonaphthalene

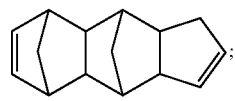

3a,4,4a,5,8,8a,9,9a-octahydro-1H-
4,9:5,8-dimethanocyclopenta[b]
naphthalene (one of trimers
of cyclopentadiene, TCPD1,
also known as CPD3)

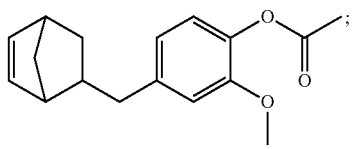

5-norbornenylmethyleugenyl acetate (EuAcNB)

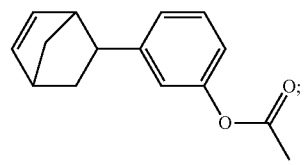

3-(bicyclo[2.2.1]hept-5-en-2-yl)
phenyl acetate (PhAcNB)

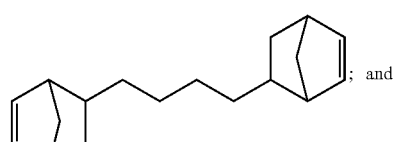
; and 1,4-di(bicyclo[2.2.1]hept-5-en-2-yl)butane
(NBBuNB)

-continued

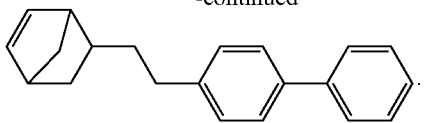

5-(2-([1,1'-biphenyl]-4-yl)ethyl)bicyclo[2.2.1]
hept-2-ene (NBEtPhPh)

Representative examples of monomer of formula (IV) include the following without any limitations:

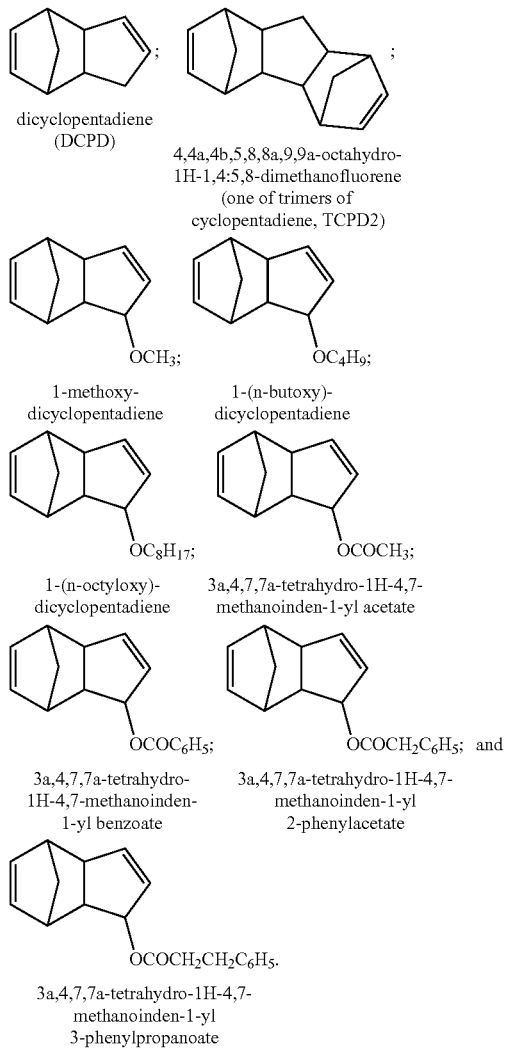

dicyclopentadiene (DCPD)

4,4a,4b,5,8,8a,9,9a-octahydro-1H-1,4:5,8-dimethanofluorene (one of trimers of cyclopentadiene, TCPD2)

1-methoxy-dicyclopentadiene 1-(n-butoxy)-dicyclopentadiene 1-(n-octyloxy)-dicyclopentadiene 3a,4,7,7a-tetrahydro-1H-4,7-methanoinden-1-yl acetate 3a,4,7,7a-tetrahydro-1H-4,7-methanoinden-1-yl benzoate 3a,4,7,7a-tetrahydro-1H-4,7-methanoinden-1-yl 2-phenylacetate; and 3a,4,7,7a-tetrahydro-1H-4,7-methanoinden-1-yl 3-phenylpropanoate.

In some embodiments the composition of this invention encompasses one or more monomer of formula (I), which is selected from the group consisting of:
tetracyclododecene (TD);
5-butylbicyclo[2.2.1]hept-2-ene (BuNB);
5-hexylbicyclo[2.2.1]hept-2-ene (HexylNB);
5-decylbicyclo[2.2.1]hept-2-ene (DecylNB);
5-phenethylbicyclo[2.2.1]hept-2-ene (PENB);
5-(2-([1,1'-biphenyl]-4-yloxy)ethyl)bicyclo[2.2.1]hept-2-ene; and
5-(2-([1,1'-biphenyl]-2-yloxy)ethyl)bicyclo[2.2.1]hept-2-ene (NBEtO-2-PhPh).

In some embodiments the composition of this invention further includes a monomer of formula (IV), which is dicyclopentadiene (DCPD). It should be noted that mixtures in any combination of aforementioned monomers of formula (I) and monomers of formula (IV) can be employed in the compositions of this invention so as to obtain the intended benefit for forming the desirable 3D objects and can be tailored in accordance with the properties required for the formation of such 3D objects.

In a further embodiment of this invention, the composition contains any of the latent organoruthenium carbide catalyst that would bring about the mass polymerization as described herein under ROMP conditions. Generally, such suitable latent catalysts include at least one known organo-ruthenium carbide complex of formula (II). See for example, Piers et al., Organometallics, 2012, 31, 5634-5637, disclose a series of organo-ruthenium carbide compounds, which are pre-catalysts for the olefin metathesis reactions, all of such catalysts may be suitable as latent catalysts in the compositions of this invention.

In some embodiments the latent catalyst which is an organo-ruthenium carbide is of formula (III):

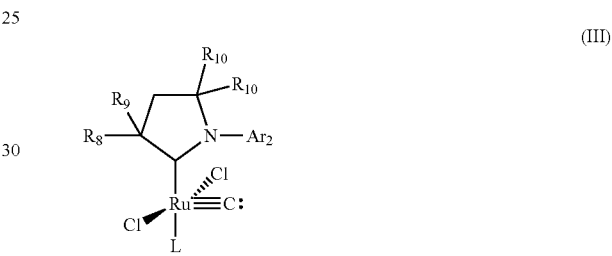

(III)

wherein:
L is $PR_3$, where R is independently selected from the group consisting of isopropyl, sec-butyl, tert-butyl, cyclohexyl and phenyl;
each $R_8$, $R_9$ and $R_{10}$ is independently selected from the group consisting of hydrogen, methyl, ethyl, n-propyl, isopropyl and phenyl;
$Ar_2$ is selected from the group consisting of 2,4-dimethylphenyl, 2,4-diethylphenyl, 2,4-diisopropylphenyl and 2,4,6-trimethylphenyl.

Generally, any of the latent organo-ruthenium carbide catalyst that would bring about ring open metathesis polymerization of the monomers of formula (I) and monomer of formula (IV) as well as monomer of formula (VII), if present, can be employed in the composition of this invention. More specifically, organo-ruthenium carbide compounds that show little or no activity at ambient temperatures can be employed. That is, the latent catalysts that are stable at or near room temperature are more suitable in the composition of this invention. The latent catalysts may be activated by a variety of conditions, including without any limitation acid and chemical activation. The chemical activation may include use of thermal acid generators or photo acid generators.

Several of the latent catalysts that are suitable to be employed in the compositions of this invention are known in the literature or can be readily made by any of the known procedures in the art. See for example, Grubbs, et al., Organometallics, 2011, 30 (24): 6713-6717; Sutar et al., Angew. Chem. Int. Ed. 2016, 55, 764-767; Leitgeh, et al., Monatsh Chem (2014) 145:1513-1517; van Hensbergen, et al., J. Mater. Chem. C. 2015, 3, 693-702; Grubbs, et al., J.

Am. Chem. Soc., 2009, 131, 203802039; Zak, et al., Eur. J. Inorg. Chem., 2014, 1131-1136; Gawin, et al., ACS Catal. 2017, 7, 5443-5449. As noted above, further examples of such catalysts can also be found in Piers et al. Accordingly, a few of the exemplary latent catalysts, which are organo-ruthenium carbide compounds, without any limitation maybe selected from the group consisting of:

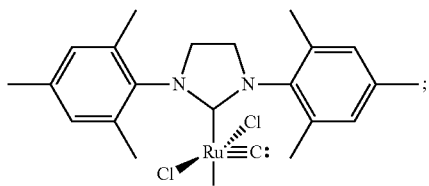

1,3-bis(2,4,6-trimethylphenyl)-imidazolidin-2-ylidene-tricyclohexylphosphine-ruthenium carbide dichloride
(Ru-1)

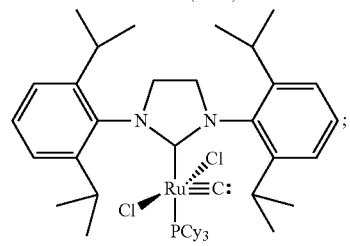

1,3-bis(2,6-diisopropylphenyl)-imidazolidin-2-ylidene-tricyclohexylphosphine-ruthenium carbide dichloride
(Ru-3)

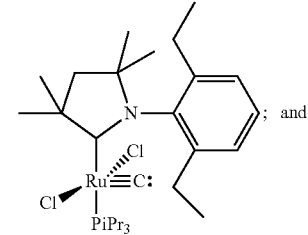

1-(2,6-diethylphenyl)-3,3,5,5-tetramethylpyrrolidin-2-ylidene-triisopropylphosphine ruthenium carbide dichloride (Ru-5)

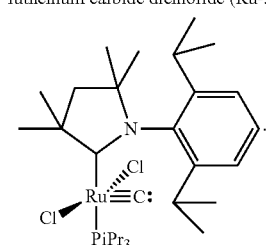

1-(2,6-diisopropylphenyl)-3,3,5,5-tetramethylpyrrolidin-2-ylidene-triisopropylphosphine ruthenium carbide dichloride (Ru-6)

As noted, the composition of this invention further contains a photoactive compound, which is generally a photosensitizer compound that can accelerate the formation of the acid from the photoacid generator when subjected to radiation at a particular wavelength. For this purpose, any suitable sensitizer compound can be employed in the compositions of the present invention. Such suitable sensitizer compounds include, photosensitizers, such as, anthracenes, phenanthrenes, chrysenes, benzpyrenes, fluoranthenes, rubrenes, pyrenes, xanthones, indanthrenes, thioxanthen-9-ones, phenothiazine, and mixtures thereof. Surprisingly it has now been found that certain of the known photoactive compounds, such as for example, a class of substituted xanthone derivatives can be used for this purpose. These photosensitizers are generally active at wavelengths from around 200 to 400 nm, and some around 240 to 370 nm.

Accordingly, in some embodiments such xanthone derivatives are of the formula (V):

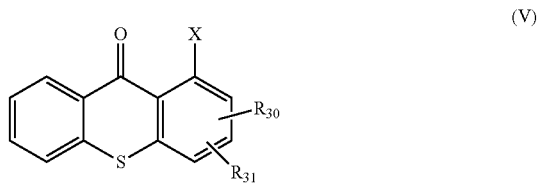

Wherein X is hydrogen or chlorine, $R_{30}$ and $R_{31}$ are the same or different and independently of each other selected from hydrogen, chlorine, methyl, ethyl, linear or branched $(C_3-C_{12})$alkyl, $(C_3-C_{12})$cycloalkyl, $(C_6-C_{12})$bicycloalkyl, $(C_7-C_{14})$tricycloalkyl, $(C_6-C_{10})$aryl, $(C_6-C_{10})$aryl$(C_1-C_3)$alkyl, $(C_1-C_{12})$alkoxy, $(C_3-C_{12})$cycloalkoxy, $(C_6-C_{12})$bicycloalkoxy, $(C_7-C_{14})$tricycloalkoxy, $(C_6-C_{10})$aryloxy$(C_1-C_3)$ alkyl and $(C_6-C_{10})$-aryloxy. In some other embodiments $R_{30}$ is hydrogen and $R_{31}$ is selected from the group consisting of methoxy, ethoxy, n-propoxy, iso-propoxy, butoxy, and the like.

Further, it has also been found that a variety of substituted triazines of the formula (VI) are also suitable as such photoactive compounds, and are especially capable of releasing a chloride ion when subjected to suitable photolytic conditions.

wherein $R_{32}$, $R_{33}$ and $R_{34}$ are the same or different and independently of each other selected from the group consisting of halogen, methyl, ethyl, linear or branched $(C_3-C_{12})$alkyl, trichloromethyl, pentachloroethyl, linear or branched perhalo$(C_3-C_{12})$alkyl, $(C_6-C_{10})$aryl, $(C_6-C_{10})$aryl$(C_1-C_3)$alkyl, perhalo$(C_6-C_{10})$aryl, perhalo$(C_6-C_{10})$arylperhalo$(C_1-C_3)$alkyl, substituted or unsubstituted five membered or six membered heteroaryl$(C_2-C_4)$alkenyl and substituted or unsubstituted $(C_6-C_{10})$aryl$(C_2-C_4)$alkenyl provided that one of $R_{32}$, $R_{33}$ and $R_{34}$ is trihalomethyl, pentahaloethyl, linear or branched perhalo$(C_3-C_{12})$alkyl. Specific examples of $R_{32}$, $R_{33}$ and $R_{34}$ include without any limitation chlorine, bromine, trichloromethyl, tribromomethyl, pentachloroethyl, pentabromoethyl, perchloropropyl, perbromopropyl, and the like.

Representative examples of the compounds of formula (V) may be listed as follows:

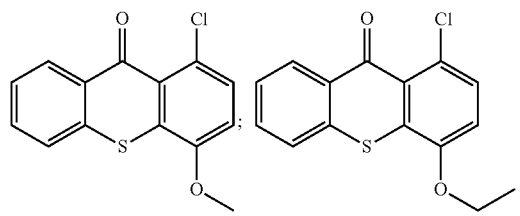

1-chloro-4-methoxy-9H-thioxanthen-9-one 1-chloro-4-ethoxy-9H-thioxanthen-9-one

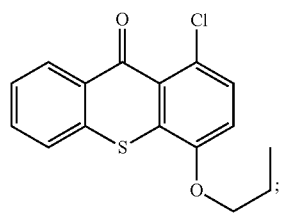

1-chloro-4-propoxy-9H-thioxanthen-9-one (commercially sold under the name CPTX from Lambson)

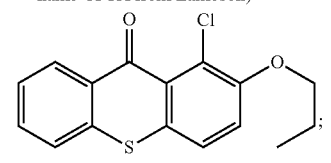

1-chloro-2-propoxy-9H-thioxanthen-9-one

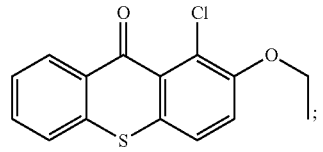

1-chloro-2-ethoxy-9H-thioxanthen-9-one

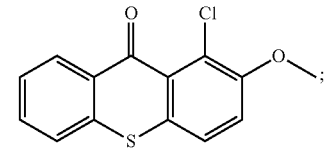

1-chloro-2-methoxy-9H-thioxanthen-9-one

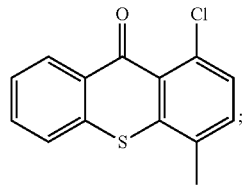

1-chloro-4-methyl-9H-thioxanthen-9-one

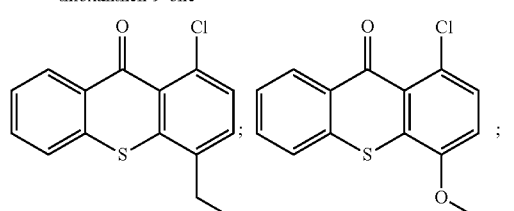

1-chloro-4-ethyl-9H-thioxanthen-9-one 1-chloro-4-phenoxy-9H-thioxanthen-9-one

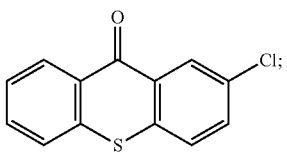

1-chlorothioxanthen-9-one (CTX)

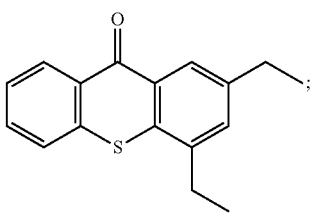

2,4-diethylthioxanthone (DETX)

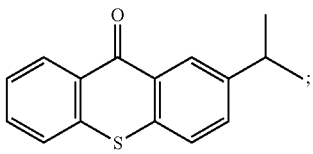

2-isopropylthioxanthone

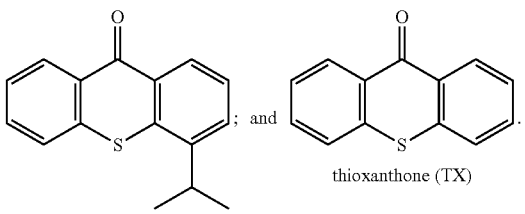

4-isopropylthioxanthone (ITX)

thioxanthone (TX)

Representative examples of the compounds of formula (VI) without any limitation may be enumerated as follows:

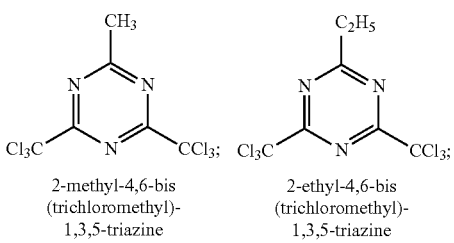

2-methyl-4,6-bis(trichloromethyl)-1,3,5-triazine 2-ethyl-4,6-bis(trichloromethyl)-1,3,5-triazine

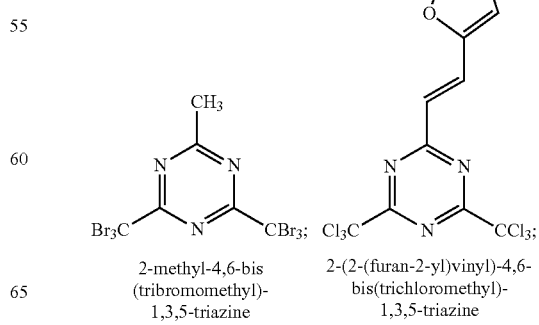

2-methyl-4,6-bis(tribromomethyl)-1,3,5-triazine 2-(2-(furan-2-yl)vinyl)-4,6-bis(trichloromethyl)-1,3,5-triazine -continued

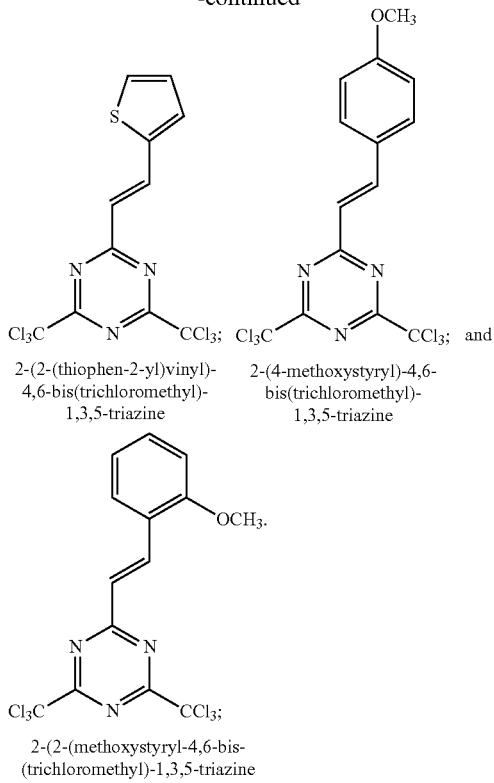

2-(2-(thiophen-2-yl)vinyl)-4,6-bis(trichloromethyl)-1,3,5-triazine 2-(4-methoxystyryl)-4,6-bis(trichloromethyl)-1,3,5-triazine; and 2-(2-(methoxystyryl-4,6-bis-(trichloromethyl)-1,3,5-triazine Advantageously, it has now been found that certain of the ruthenium compounds of formula (II) or (III) does not require a photoactive compound of formula (V) or a compound of formula (VI). Thus in some embodiments of this invention the component A of the composition of this contains a ruthenium compound of formula (II) or (III), and component B of the composition of this invention contains a photoactive (or thermoactive) acid generators. Again, either or both components A and B can contain one or more monomers of formulae (I) and if necessary one or more monomers of formula (IV) and/or one or more monomers of formula (VII).

In some embodiments the compounds of formula (V) can be activated at certain wavelength of the electromagnetic radiation which can generally range from about 240 nm to 400 nm. Accordingly, any of the compounds which are active in this electromagnetic radiation can be employed in the compositions of this invention which are stable to the 3D fabrication methods. In some embodiments the wavelength of the radiation to activate the compounds of formula (V) is 260 nm. In some other embodiments the wavelength of the radiation to activate the compounds of formula (V) is 310 nm. In yet some other embodiments the wavelength of the radiation to activate the compounds of formula (V) is 365 nm or 395 nm, and so on.

However, any of the other known photoactive compounds which accelerate the generation of photoacid and/or generate the chloride ion in order to activate the latent catalysts, if needed, herein can also be used in the composition of this invention. All such compounds are part of this invention.

Any amount of latent catalyst and the compound of formula (V) or a compound of formula (VI) can be employed in the composition of this invention which will bring about the intended result. Generally, the molar ratio of monomer:latent catalyst:compound of formula (V) or a compound of formula (VI) is in the range of 10,000:1:1 to 5,000:1:1 or lower. In some other embodiments, the compound of formula (V) or a compound of formula (VI) is employed at higher level than the latent catalyst, for example, such ranges may include monomer:latent catalyst: photo active initiator is 10,000:1:2, 10,000:1:4 or higher. In some other embodiments such monomer:latent catalyst: photo active initiator is 15,000:1:4, 20,000:1:4 or higher.

As noted, the composition of this invention further contains one or more additives selected from the group consisting of a photoactive acid generator, a thermal acid generator, and a mixture in any combination thereof. In some embodiments the photoacid generator of the formula (VIII) is employed in the composition of this invention:

Wherein $Aryl_1$ and $Aryl_2$ are the same or different and are independently selected from the group consisting of substituted or unsubstituted phenyl, biphenyl and naphthyl; Hal is iodine or bromine; and $An^\ominus$ is a weakly coordinating anion (WCA) which is weakly coordinated to the cation complex. More specifically, the WCA anion functions as a stabilizing anion to the cation complex. The WCA anion is relatively inert in that it is non-oxidative, non-reducing, and non-nucleophilic. In general, the WCA can be selected from borates, phosphates, arsenates, antimonates, aluminates, boratobenzene anions, carborane, halocarborane anions, sulfonamidate and sulfonates.

Representative examples of the compounds of formula (VIII) may be listed as follows:

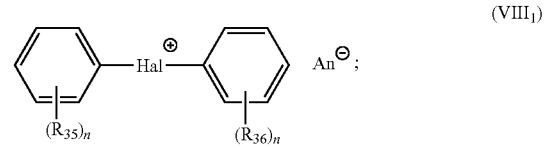

(VIII$_1$)

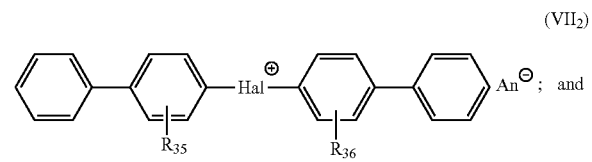

(VII$_2$) and

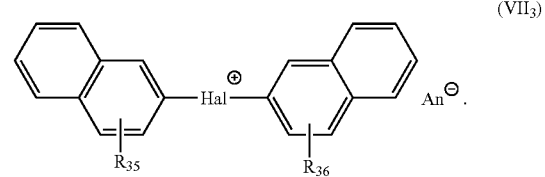

(VII$_3$)

Wherein n is an integer from 0 to 5; $R_{35}$ and $R_{36}$ are the same or different and independently of each other selected from methyl, ethyl, linear or branched ($C_3$-$C_{20}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_3$)alkyl, ($C_1$-$C_{12}$) alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy($C_1$-$C_3$)alkyl, ($C_6$-$C_{10}$)-aryloxy, ($C_6$-$C_{10}$)-thioaryl and ($C_6$-$C_{10}$)-thioaryl-($C_6$-$C_{10}$) diarylsulfonium salt. $An^\ominus$ is selected from the group consisting of $Cl^\ominus$, $Br^\ominus$, $I^\ominus$, $BF_4^\ominus$, $B(C_6F_5)_4^\ominus$, $PF_6^\ominus$, n-$C_4F_9SO_3^\ominus$, $CF_3SO_3^\ominus$ and p-$CH_3(C_6H_4)$—$SO_3^\ominus$.

It should further be noted that more than one $R_{35}$ and $R_{36}$ substituent can be present in aforementioned compounds of formula (VIII$_2$) or (VIII$_3$). Interestingly, it has now been found that compounds of formula (VIII$_1$) where $R_{35}$ and $R_{36}$ are longer chain alkyl groups, such as for example, $(C_{10}H_{21}—C_{13}H_{27})$alkyl, provide certain benefits in that such photoacid generators are soluble in many of the monomers of formula (I) or monomers of formula (IV), thus avoiding any need to use solvent to dissolve such photoacid generators and thus providing additional advantages.

Similarly, various other known sulfonium salts and quaternary ammonium salts can also be employed. A representative example of such sulfonium salt of formula (IX) is shown below:

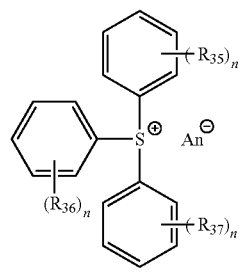

(IX)

Wherein n, $An^\ominus$, $R_{35}$ and $R_{36}$ are as defined above, and $R_{37}$ is independently same as defined for $R_{35}$ and $R_{36}$.

Non-limiting examples of suitable additives that may be employed in the composition of this invention are listed below:

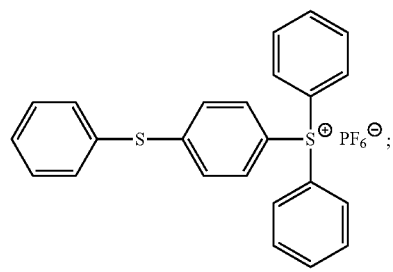

(4-thiophenyl)phenyl-
diphenylsulfonium hexafluorophosphate

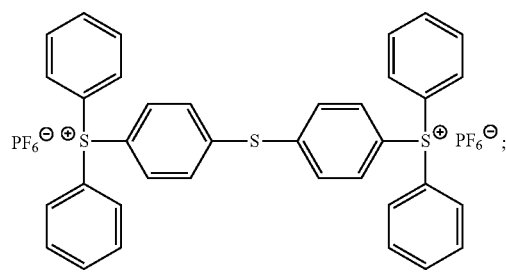

bis-(triphenylsulfonium) sulfide bis-hexafluorophosphate
(collectively TS-HFP)

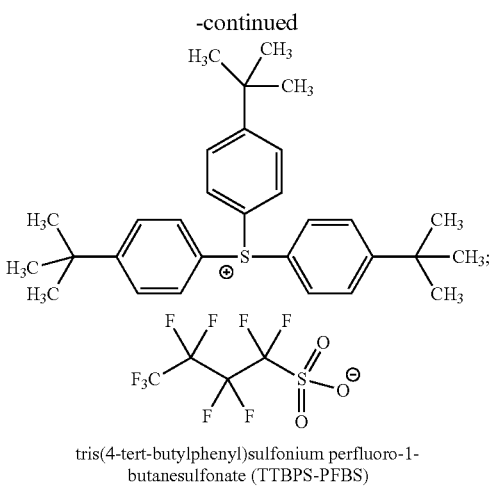

tris(4-tert-butylphenyl)sulfonium perfluoro-1-
butanesulfonate (TTBPS-PFBS)

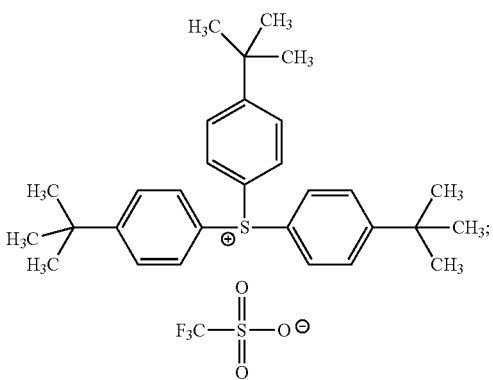

tris(4-tert-butylphenyl)sulfonium triflate (TTBPS-TF)

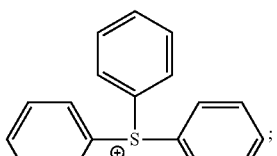

triphenylsulfonium chloride
(TSP-Cl)

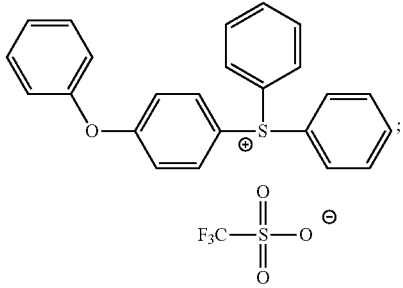

(4-phenoxyphenyl)diphenylsulfonium triflate
(PPDP-ST)

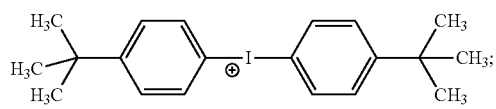

bis(4-tert-butylphenyl)iodonium perfluoro-1-butanesulfonate
(BTBI-PFBS)

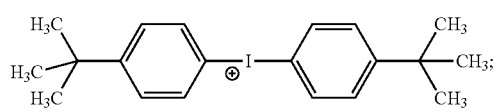

bis(4-tert-butylphenyl)iodonium p-toluenesulfonate
(BTBI-PTS)

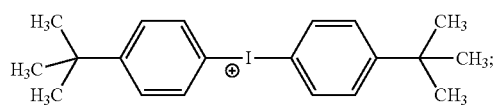

bis(4-tert-butylphenyl)iodonium triflate (BTBPI-TF)

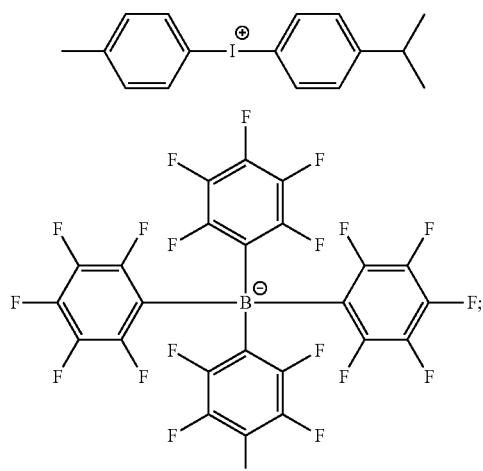

tolylcumyliodonium-tetrakis pentafluorophenylborate,
commercially available as Rhodorsil 2074

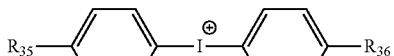

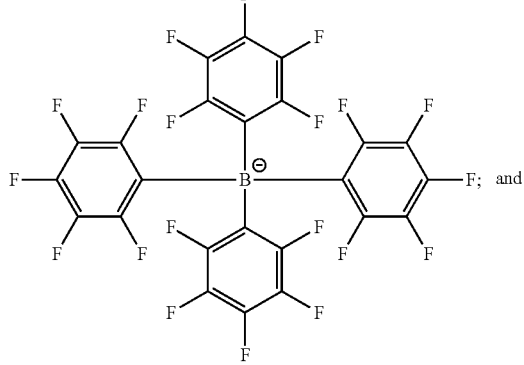

where $R_{35}$ and $R_{36}$ are the same or different and
each independently selected from linear or
branched $(C_{10}\text{-}C_{13})$alkyl, commercially
available as Silcolease UV CATA 243 from Elkem

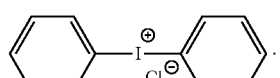

diphenyleneiodonium chloride
(DPI-Cl)

Various other photoactive (or thermoactive) acid generators are also known in the art which may not be encompassed by the generic structures shown above. All such photoacid (or thermoactive) acid generators can also be used in the composition of this invention. Non-limiting examples of such photoactive (or thermoactive) acid generators may be enumerated as follows:

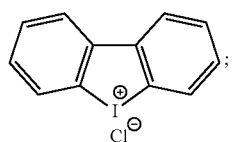

diphenyleneiodonium chloride (DPEI-Cl)

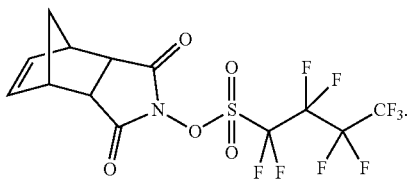

N-hydroxy-5-norbornene-2,3-dicarboximide perfluoro-1-butanesulfonate (HNPCI-PFBS)

Another representative class of thermal acid generators is a variety of quaternary ammonium salts, including halides, acetates, trifluoroacetates, phosphates, hexafluorophosphates, hexafuoroantimonates and sulfonate salts. For example, quaternary ammonium sulfonate salts may be generically represented by the following formula:

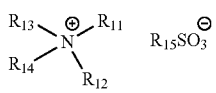

wherein $R_{11}$, $R_{12}$, $R_{13}$ and $R_{14}$ are the same or different and each independently selected from the group consisting of methyl, ethyl, linear or branched ($C_3$-$C_{16}$)alkyl, perfluoro ($C_1$-$C_{12}$)alkyl, substituted or unsubstituted ($C_6$-$C_{10}$)aryl, substituted or unsubstituted ($C_6$-$C_{10}$)aryl($C_3$-$C_{16}$)alkyl, ($C_3$-$C_{12}$)cycloalkyl or wherein any two of $R_{11}$, $R_{12}$, $R_{13}$ and $R_{14}$ taken together with the nitrogen atom to which they are attached form a ($C_3$-$C_{12}$)cyclic or ($C_5$-$C_{12}$)bicyclic ring; and $R_{15}$ is selected from the group consisting of methyl, ethyl, linear or branched ($C_3$-$C_{16}$)alkyl, perfluoro($C_1$-$C_{12}$)alkyl, substituted or unsubstituted ($C_6$-$C_{10}$)aryl and substituted or unsubstituted ($C_6$-$C_{10}$)aryl($C_3$-$C_{16}$)alkyl.

Non-limiting examples of such quaternary ammonium salts include without any limitation tetra-alkylammonium salts, such as for example, tetraethyl ammonium acetate, tetrabutylammonium chloride, and the like. Other representative quaternary ammonium salts include a variety of sulfonate salts commercially available under the tradename K-PURE® quaternary ammonium blocked acids, from King Industries. Various quaternary ammonium sulfonate salts can be employed including the salts of dinonylnaphthalene disulfonic acid, dinonylnaphthalene sulfonic acid, para-toluene sulfonic acid, dodecylbenzene sulfonic acid, methane sulfonic acid, trifluoromethane sulfonic acid and perfluorobutane sulfonic acid. Representative examples of such quaternary ammonium sulfonates include without any limitation N,N,N-trimethyl-N-benzyl triflate, N-benzyl-N,N-dimethyl-4-nitro-N-phenyl nonafluorobutane sulfonate, 4-methyl-N-benzyl-N,N-dimethyl-N-phenyl triflate, N-benzyl-N,N-dimethyl-N-phenyl triflate, 4-methoxy-N-benzyl-N,N-dimethyl-N-phenyl triflate, and the like. A few of these quaternary ammonium salts are available commercially, for example, TAG-2678, TAG-2689 and TAG-2700, all from King Industries.

Another class of quaternary salts includes various pyridinium sulfonate salts of the formula shown below. Such pyridinium salts may also include other anions such as the ones mentioned above, i.e., halides, acetates, trifluoroacetates, phosphates, hexafluorophosphates, hexafuoroantimonates and the like.

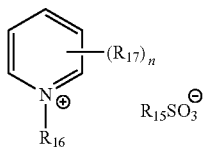

wherein n is an integer from 0 to 5;

$R_{15}$ is as defined above;

$R_{16}$ selected from the group consisting of methyl, ethyl, linear or branched ($C_3$-$C_{16}$)alkyl, perfluoro($C_1$-$C_{12}$)alkyl and substituted or unsubstituted ($C_6$-$C_{10}$)aryl and substituted or unsubstituted ($C_6$-$C_{10}$)aryl($C_3$-$C_{16}$)alkyl; and $R_{17}$ is independently selected from the group consisting of methyl, ethyl, linear or branched ($C_3$-$C_{16}$)alkyl, perfluoro ($C_1$-$C_{12}$)alkyl, substituted or unsubstituted ($C_6$-$C_{10}$)aryl and substituted or unsubstituted ($C_6$-$C_{10}$)aryl($C_3$-$C_{16}$)alkyl.

Representative examples of such pyridinium salts include without any limitation pyridinium triflate, 1-(4-methoxyphenyl)methyl-pyridinium triflate, and the like.

However, any of the other known photoactive or thermally active compounds which generate the activator for the latent catalysts employed herein can also be used in the composition of this invention. All such compounds are part of this invention.

Any of the amounts of photoactive (or thermoactive) acid generators can be employed herein that would bring about the intended result. Generally, such amounts varies from twice the molar amounts to that of the ruthenium compound to three or four times the molar amounts of the ruthenium compound as employed herein. That is, molar ratio of organo-ruthenium compound of formula (II) or (III) to photo acid generator is generally 1:2 or 1:3 or 1:4 or higher. However, in some situations equimolar amounts of ruthenium compound and the photoacid generator may also be suitable.

Advantageously, it has further been found that the composition according to this invention forms a substantially three dimensional object when mass polymerized, generally, when exposed to suitable radiation at a wavelength in the range from 260 nm to 400 nm. That is to say, when the composition of this invention is exposed to suitable radiation, the monomers undergo mass polymerization to form solid objects under routine 3D printing technologies.

In some other embodiments the compositions of this invention can also be photopatterned by image-wise exposing the compositions of this invention to a suitable radiation. Similarly, the compositions of this invention are also useful for forming photo imprint of a suitable substrate. That is, the composition of this invention can be employed in a variety of photo or thermal induced nanoimprint lithography (NIL). For example, a patterned digital video disk (DVD) can be replicated by pouring onto such exposed patterned DVD a combined mixture of component A and component B of this invention and then subjecting the coated surface to a suitable radiation. Upon such exposure the solidified film can be peeled off from the substrate which will have a reproduction of the original disk as fully described in specific example that follows.

Accordingly, in some embodiments the composition of this invention undergoes mass polymerization when both components A and B are mixed and exposed to suitable UV irradiation which is substantially free of any monomer or volatile oligomeric product. The resulting solid form takes shape of the substrate and/or can be photopatterned by imagewise exposure and developing the image formed therefrom.

It has also been found that various other viscosity modifiers that are compatible with the compositions of this invention can also be employed in order to modulate the viscosity of the composition before subjecting it to the mass polymerization conditions. Suitable examples of such viscosity modifiers include transparent polymers such as for example polystyrene, polyesters (polyethylene teraphthalate, PET), and the like.

Accordingly, in some embodiments of this invention there is provided two component composition comprising in component A one or more monomers of formula (I), optionally one or more monomers of formula (IV), a latent organoruthenium catalyst of formula (II) or (III) and a compound of formula (V) as described hereinabove. And in component B a solution of a photoacid generator in a suitable solvent and/or one or more monomers of formulae (I), (IV) or (VII). Any of the monomers of formula (I) as described hereinabove can be used in this aspect of the invention, optionally in combination with one or more monomers of formula (IV) or (VII). The monomers of formula (I) featuring a viscosity below 50 centipoise are generally employed. When more than two monomers of formula (I) are employed the first monomer is completely miscible with the second monomer and forms a clear solution. When the composition is exposed to suitable irradiation and fabricated under suitable 3D printing conditions forms a 3D object.

In another embodiment of this invention, the composition of this invention encompasses component A containing a mixture of 5-phenethylbicyclo[2.2.1]hept-2-ene (PENB), 1,3-bis (2,4,6-trimethylphenylimidazolidin-2-ylidene)-tricyclohexylphosphine-ruthenium carbide dichloride (Ru-1) and 1-chloro-4-propoxy-9H-thioxanthen-9-one (CPTX), and component B containing a solution of tolylcumyliodonium-tetrakis pentafluorophenylborate (Rhodorsil 2074) in toluene.

In another embodiment of this invention, the composition of this invention encompasses component A containing a mixture of 5-phenethylbicyclo[2.2.1]hept-2-ene (PENB), 1,3-bis (2,6-diisopropylphenylimidazolidin-2-ylidene)-tricyclohexylphosphine-ruthenium carbide dichloride (Ru-3) and 1-chloro-4-propoxy-9H-thioxanthen-9-one (CPTX), and component B containing a solution of tolylcumyliodonium-tetrakis pentafluorophenylborate (Rhodorsil 2074) in toluene.

In another embodiment of this invention, the composition of this invention encompasses component A containing a mixture of 5-phenethylbicyclo[2.2.1]hept-2-ene (PENB), diethylphenyl)-3,3,5,5-tetramethylpyrrolidin-2-ylidene-triisopropylphosphine ruthenium carbide dichloride (Ru-5) and 1-chloro-4-propoxy-9H-thioxanthen-9-one (CPTX), and component B containing a solution of tolylcumyliodonium-tetrakis pentafluorophenylborate (Rhodorsil 2074) in toluene.

In another embodiment of this invention, the composition of this invention encompasses component A containing a mixture of 5-phenethylbicyclo[2.2.1]hept-2-ene (PENB), diisopropylphenyl)-3,3,5,5-tetramethylpyrrolidin-2-ylidene-triisopropylphosphine ruthenium carbide dichloride (Ru-6) and 1-chloro-4-propoxy-9H-thioxanthen-9-one (CPTX), and component B containing a solution of tolylcumyliodonium-tetrakis pentafluorophenylborate (Rhodorsil 2074) in toluene.

In another embodiment of this invention, the composition of this invention encompasses component A containing a mixture of 5-phenethylbicyclo[2.2.1]hept-2-ene (PENB), 1,3-bis (2,4,6-trimethylphenylimidazolidin-2-ylidene)-tricyclohexylphosphine-ruthenium carbide dichloride (Ru-1) and 1-chloro-4-propoxy-9H-thioxanthen-9-one (CPTX), and component B containing a mixture of 5-(2-([1,1'-biphenyl]-2-yloxy)ethyl)bicyclo[2.2.1]hept-2-ene (NBEtO-2-PhPh) and tolylcumyliodonium-tetrakis pentafluorophenylborate tolylcumyliodonium-tetrakis pentafluorophenylborate (Rhodorsil 2074).

In another embodiment of this invention, the composition of this invention encompasses component A containing a mixture of 5-phenethylbicyclo[2.2.1]hept-2-ene (PENB), dicyclopentadiene (DCPD), 1-(2,6-diethylphenyl)-3,3,5,5-tetramethylpyrrolidin-2-ylidene-triisopropylphosphine ruthenium carbide dichloride (Ru-5) and 1-chloro-4-propoxy-9H-thioxanthen-9-one (CPTX), and component B containing a mixture of 5-(2-([1,1'-biphenyl]-2-yloxy) ethyl) bicyclo[2.2.1]hept-2-ene (NBEtO-2-PhPh) and tolylcumyliodonium-tetrakis pentafluorophenylborate (Rhodorsil 2074).

In another embodiment of this invention, the composition of this invention encompasses component A containing a mixture of 5-phenethylbicyclo[2.2.1]hept-2-ene (PENB), dicyclopentadiene (DCPD), 1,3-bis(2,6-diisopropylphenylimidazolidin-2-ylidene)-tricyclohexylphosphine-ruthenium carbide dichloride (Ru-6) and 1-chloro-4-propoxy-9H-thioxanthen-9-one (CPTX), and component B containing a mixture of 5-(2-([1,1'-biphenyl]-2-yloxy) ethyl)bicyclo[2.2.1]hept-2-ene (NBEtO-2-PhPh) and tolylcumyliodonium-tetrakis pentafluorophenylborate (Rhodorsil 2074).

In another embodiment of this invention, the composition of this invention encompasses component A containing a mixture of 2-hexyl-1,2,3,4,4a,5,8,8a-octahydro-1,4:5,8-dimethanonaphthalene (HexylTD), 3a,4,4a,5,8,8a,9,9a-octahydro-1H-4,9:5,8-dimethanocyclopenta[b]naphthalene (CPD3), 1-(2,6-diethylphenyl)-3,3,5,5-tetramethylpyrrolidin-2-ylidene-triisopropylphosphine ruthenium carbide dichloride (Ru-5) and 4-isopropylthioxanthone (ITX), and component B containing a mixture of 2-hexyl-1,2,3,4,4a,5,8,8a-octahydro-1,4:5,8-dimethanonaphthalene (HexylTD), 3a,4,4a,5,8,8a,9,9a-octahydro-1H-4,9:5,8-dimethanocyclopenta[b]naphthalene (CPD3) and bis(4-decylphenyl) iodonium-tetrakis pentafluorophenylborate.

In a further aspect of this invention there is also provided a kit for forming a three dimensional object. There is dispensed in this kit component A and component B of the composition of this invention. Accordingly, in some embodiments there is provided a kit in which there is dispensed in two separate components one or more monomers of formula (I), optionally one or more monomers of formula (IV) and/or one or more monomers of formula (VII) and a compound of formula (V), so as to obtain a desirable result and/or for intended purpose. Further, said kit comprises a latent catalyst and photo (or thermoactive) acid generator as described herein. The monomers of formulae (I), (IV) or (VII) are the ones as described hereinabove.

In some embodiments, the aforementioned kit encompasses two or more monomers of formula (I) distinct from one another as described hereinabove. In some other embodiments the kit of this invention encompasses at least two monomers wherein first monomer facilitates dissolution of the second monomer and/or the latent catalyst and the additives as described hereinabove. Any of the monomers of formula (I) as described herein can be used in this embodiment. The molar ratio of first and the second monomer of formula (I) contained in these components can vary and may range from 1:99 to 99:1, or 10:90 to 90:10, 20:80 to 80:20, 30:70 to 70:30, 60:40 to 40:60 or 50:50, and so on. In some other embodiments the kit may encompass a composition wherein dispensed more than two monomers of formula (I), each distinct from one another. Further, as noted the first monomer of formula (I) is completely soluble in the second monomer of formula (I) to form a clear solution at room temperature. In some embodiments the monomer mixture may become a clear solution at slightly elevated temperature, such as for example, 30° C. or 40° C. or 50° C., before they undergo mass polymerization. In another aspect of this embodiment of this invention the composition of this invention undergoes mass polymerization when exposed to a suitable radiation for a sufficient length of time to form a 3D object. That is to say that the composition of this invention when used in a suitable 3D printing system capable of exposing to a suitable radiation forms a desirable 3D object. Generally, as already noted above, such polymerization can take place when exposed to suitable radiation at a wavelength from about 260 nm to 400 nm or higher. The exposure can be at stages from 260 nm to 400 nm or at suitable wavelengths as described herein. By practice of this invention it is now possible to form 3D objects using any of the known 3D printing technologies.

In some embodiments the kit according to this invention contains at least two monomers of formula (I) distinct from one another, wherein one monomer is completely soluble in the other monomer, and when said composition is exposed to radiation at 395 nm for a sufficient length of time it forms a three dimensional object.

In some embodiments, the kit as described herein encompasses various compositions as described herein.

As noted, the compositions of this invention can be used in any of the known three dimensional (3D) printing technologies and other printing technologies. A few of the 3D printing procedures known in the art include continuous liquid interface production (CLIP), layer by layer approach (LBL), inkjet printing and frontal polymerization method, such as frontal ring open metathesis (FROMP) technique, see for example Robertson et al., Nature, Vol. 557, 223-227 (2018).

In a CLIP approach, a 3D object is continuously formed by projecting a continuous sequence of UV images (generated by a digital light-processing (DLP) imaging unit or a laser to generate the part) through an oxygen permeable, UV-transparent window below a liquid resin bath containing the compositions of this invention. The dead zone created above the window maintains a liquid interface below the advancing part. Above the dead zone, the curing part is continuously drawn out of the resin bath. The suction forces resulted due to this drawing replenishes the resin bath at the same time. In this way various parts of different dimensions up to several centimeters with part resolution lower than 100 microns can be fabricated.

In a 3D inkjet printing technology, the compositions of this invention can be used as photopolymerizable ink compositions to form lines and vias on a substrate, typically on a silicon wafer. A wide variety of parts having utility in electronic and optoelectronic applications can thus be manufactured using the compositions of this invention. Non limiting examples of such applications include manufacturing of OLED devices on a variety of substrates, which can be produced substantially in a particle free environment at high yields. The compositions of this invention may act as organic encapsulant layers and/or as filler materials in some of such OLED devices.

Accordingly, in yet another aspect of this invention there is further provided a method of forming a three dimensional object comprising:
providing a homogeneous clear composition in a suitable container, the composition comprising one or more monomers of formula (I), a latent catalyst and a compound of formula (V) or a compound of formula (VI), optionally in combination with one or more monomers of formula (IV);
exposing to suitable UV radiation while drawing the composition from the container; and
forming a three dimensional object.

The 3D objects formed in accordance with the method of this invention exhibit excellent thermal and mechanical properties. In general, the properties of these objects can be tailored to intended end use. For example, the thermal properties of the 3D objects can be tailored to be stable up to 180° C. or higher depending upon the types of monomers of formula (I) in combination with monomers of formula (IV) employed to form such 3D objects. Similarly, the mechanical properties can also be tailored to desired mechanical properties simply by the selection of suitable monomers as described herein. In general, by tailoring the proper choice of monomers the parts possessing very high impact strength can be fabricated.

Accordingly, in some of the embodiments of this invention there is also provided a three dimensional object comprising the composition of this invention which exhibits excellent thermal and mechanical properties.

In yet some other embodiments the composition of this invention can also be used in a variety of thermal and/or photo induced nanoimprint lithography (NIL), such as for example, UV-NIL. For instance, the compositions of this invention can be used in a variety of photocurable imprint technology. Typically in such applications, the component A and component B of this invention are mixed together and suitably placed on a substrate, which is then covered by a suitable stamp and exposed to radiation so as to allow the composition of this invention to cure to a solid. The stamp is then released to obtain the nano-imprinted film.

The following examples are detailed descriptions of methods of preparation and use of certain compounds/monomers, polymers and compositions of the present invention. The detailed preparations fall within the scope of, and serve to exemplify, the more generally described methods of preparation set forth above. The examples are presented for illustrative purposes only, and are not intended as a restriction on the scope of the invention. As used in the examples and throughout the specification the ratio of monomer to catalyst is based on a mole to mole basis.

EXAMPLES

The following abbreviations have been used hereinbefore and hereafter in describing some of the compounds, instruments and/or methods employed to illustrate certain of the embodiments of this invention:

PENB—5-phenethylbicyclo[2.2.1]hept-2-ene; NBEtO-2-PhPh—5-(2-([1,1'-biphenyl]-2-yloxy) ethyl)bicyclo[2.2.1]hept-2-ene; HexylTD—2-hexyl-1,2,3,4,4a,5,8,8a-octahydro-1,4:5,8-dimethanonaphthalene; DCPD—dicyclopentadiene; CPD3—3a,4,4a,5,8,8a,9,9a-octahydro-1H-4,9:5,8-dimethanocyclopenta[b]naphthalene; Ru-1—1,3-bis(2,4,6-trimethylphenylimidazolidin-2-ylidene)-tricyclohexylphosphine-ruthenium carbide dichloride; Ru-3—1,3-bis(2,6-diisopropylphenylimidazolidin-2-ylidene)-tricyclohexylphosphine-ruthenium carbide dichloride; Ru-5—1-(2,6-diethylphenyl)-3,3,5,5-tetramethylpyrrolidin-2-ylidene-triisopropylphosphine ruthenium carbide dichloride; Ru-6—1-(2,6-diisopropylphenyl)-3,3,5,5-tetramethylpyrrolidin-2-ylidene-triisopropylphosphine ruthenium carbide dichloride; CPTX—1-chloro-4-propoxy-9H-thioxanthen-9-one; ITX—4-isopropylthioxanthone; Rhodorsil 2074—tolylcumyliodonium-tetrakis pentafluorophenylborate; Silcolease UV CATA 243—dialkyliodonium-tetrakis pentafluorophenylborate as described herein; DSC—differential scanning calorimetry; TGA—thermogravimetric analysis; UV-NIL—ultraviolet nanoimprint lithography.

Various monomers as used herein are either commercially available or can be readily prepared following the procedures as described in U.S. Pat. No. 9,944,818.

The following Examples demonstrate that the compositions of this invention are quite stable at ambient temperature conditions and even up to 35° C. for several days and can very readily be mass polymerized by exposing to a suitable radiation as specified below.

Example 1

Mass Polymerization of PENB

Component A of this invention was first prepared in a glass bottle as follows: Ru-6 (1 molar part) and CPTX (2 molar part) were dissolved in PENB (10,000 molar parts) to form a clear solution. Component B of this invention was then prepared in a separate glass bottle as follows: Rhodorsil 2074 (2 molar parts) was dissolved in sufficient toluene (about 1 weight percent of total formulation). Both solutions were then mixed together and purged with nitrogen for 2 hours. The solution was UV light exposed (UV LED flash light 395 nm for 3 min). The solution turned to a solid indicating the monomer was fully polymerized, as confirmed by both UV/DSC and TGA. The residue percentage from isothermal TGA (1 h at 100° C.) after UV exposure was >99%.

Examples 2-3

Mass Polymerization of PENB

The procedures of Example 1 were substantially repeated in these Examples 2 and 3 except that various different ruthenium carbide catalysts as listed in Table 1 were employed. The monomer and catalyst loading used in each of these Examples 2 and 3, and the heat of reaction as measured from the UV DSC are summarized in Table 1.

TABLE 1

| Example No. | Monomer (molar parts) | Ru-complex loading, (molar parts) | UV DSC, J/g |
|---|---|---|---|
| 2 | PENB (10,000) | Ru-3 (1) | 220 |
| 3 | PENB (10,000) | Ru-5 (1) | 275 |

Examples 4-5

Mass Polymerization of Various Monomers

The procedures of Example 1 were substantially repeated in these Examples 4 and 5 except that various different monomers and catalysts as listed in Table 2 were employed. NBEtO-2-PhPh itself served as a solvent to dissolve Rhodorsil 2074 in these Examples 4-5, instead of toluene. The monomers used in each of these Examples 4-5, catalyst loading, Rhodorsil 2074 and heat of reaction from UV DSC are summarized in Table 2.

TABLE 2

| Example No. | Monomers (molar parts) | Ru-complex loading, (molar parts) | UV DSC, J/g |
|---|---|---|---|
| 4 | PENB/NBEtO-2-PhPh 90/10 molar ratio (10,000) | Ru-1 (1) | 260 |
| 5 | DCPD/PENB/NBEtO-2-PhPh 85/5/10 molar ratio (10,000) | Ru-5 (1) | 250 |

Example 6

The procedures of Example 5 was substantially repeated in this Example 6 except that ITX was used instead of CPTX. Total heat of reaction from UV DSC was 400 J/g indicating substantial completion of polymerization reaction.

Examples 7-9

The procedures of Example 1 was substantially repeated in these Examples 8 to 10 except that various different catalysts were employed as listed in Table 3. None of these compositions contained CPTX. The compositions were exposed to UV ABM Mask Aligner Broadband. The results are summarized in Table 3. It is evident from these results that the compositions of this invention are still active without CPTX, i.e., the photosensitizers.

TABLE 3

| Example No. | Ru-complex | Visual appearance after UV exposure |
|---|---|---|
| 7 | Ru-3 | solid |
| 8 | Ru-5 | solid |
| 9 | Ru-6 | solid |

Examples 10-11

Component A Shelf Life Studies

Component A was prepared in separate glass bottles containing various Ru-catalysts (1 molar part) dissolved in PENB (10,000 molar parts) to form a clear solution as listed in Table 4. Viscosity changes for each of these Examples 10-11 at room temperature were monitored over a period of seven days and are summarized in Table 4. As summarized in Table 4, component A of Examples 10 and 11 were in liquid form with more or less similar viscosities even at the end of seven days.

TABLE 4

| Example No. | Ru-complex | Viscosity at day 0, cPa | Viscosity at day 1, cPa | Viscosity at day 7, cPa |
|---|---|---|---|---|
| 10 | Ru-3 | 7.2 | 8.4 | 9.2 |
| 11 | Ru-5 | 7.2 | 7.3 | 8.1 |

Example 12

Formation of 3D Objects

In a glass bottle, Ru-5 (0.0041 g, 0.0067 mmol), Rhodorsil (0.0136 g, 0.00134 mmol) and CPTX (0.0041 g, 0.0134 mmol) were dissolved in DCPD/NBEtO-2-PhPh (90/10 mole ratio, 10 g, 67.56 mmol) to form a clear solution, the monomer to catalyst ratio was at 10,000:1. The solution was kept overnight at r.t. and had become viscous. This viscous solution was then filled into a motorized syringe and slowly pushed out of the nozzle at a steady rate while exposing the nozzle to UV light (LED 270 mW/cm$^2$, 395 nm), the liquid coming out of the nozzle immediately solidified forming a 3D object.

Example 13

Shelf Life/Reactivity Studies

Two separate Component A were prepared in two separate glass bottles, each of which containing Ru-5 (1 molar part) and CPTX (2 molar parts) dissolved in PENB (5,000 molar parts) to form a clear solution. Similarly, two separate Component B were prepared in two separate glass bottles, each of which contained Rhodorsil 2074 (2 molar parts) dissolved in PENB/NBEtO-2-PhPh (4,000/1,000 molar parts). Both Components A and B kept separately were purged with nitrogen for 2 hours. The reactivity of one of Component A and one of Component B was checked by mixing them together immediately after purging them over nitrogen for 2 hours using UV DSC (30° C., 250 mW/cm$^2$, 4 sec of 400 nm UV light), the heat of reaction was measured to be 400 J/g. The other set of Component A and Component B were stored at room temperature for ten days during which time no viscosity change was observed. The reactivity of these two components were checked at this time by mixing them together in the same fashion as before using UV DSC (30° C., 250 mW/cm$^2$, 4 sec of 400 nm UV light), the heat of reaction was measured to be 389 J/g. This clearly demonstrates that the two component compositions of this invention is not only stable at ambient conditions but also retains the same reactivity after storage for several days when mixed together and subjected to suitable radiation.

Example 14

Mass Polymerization of HexylTD/CPD3

In a glass bottle, Component A was prepared by dissolving Ru-5 (1 molar part) and ITX (8 molar parts) in HexylTD/CPD3 (9,000/1,000 molar parts) to form a clear solution. Component B was similarly formed by dissolving Silcolease UV CATA 243 (4 molar parts) in HexylTD/CPD3 (9,000/1,000 molar parts) to form a clear solution and both components were purged with nitrogen for 5 hours. Both Component A and B were then mixed together and exposed to UV DSC (30° C., 250 mW/cm$^2$, 4 sec of 400 nm UV light). The heat of reaction was measured to be 432 J/g indicating complete polymerization of the monomers.

Example 15

UV-NIL of DCPD/NBEtO-2-PhPh Composition

Figure 1B:
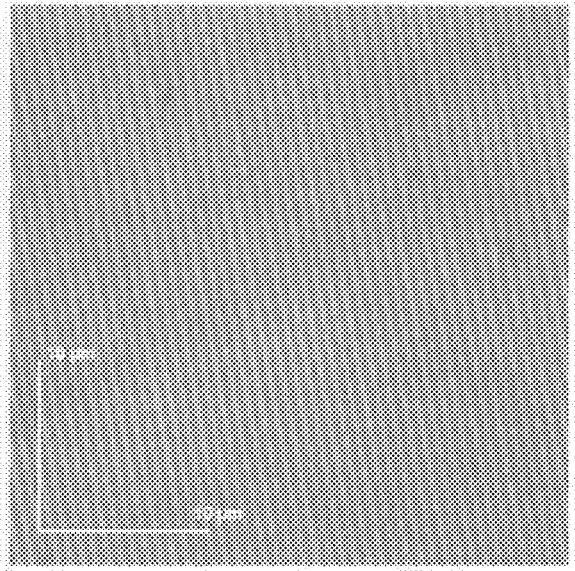
Figure 2A:
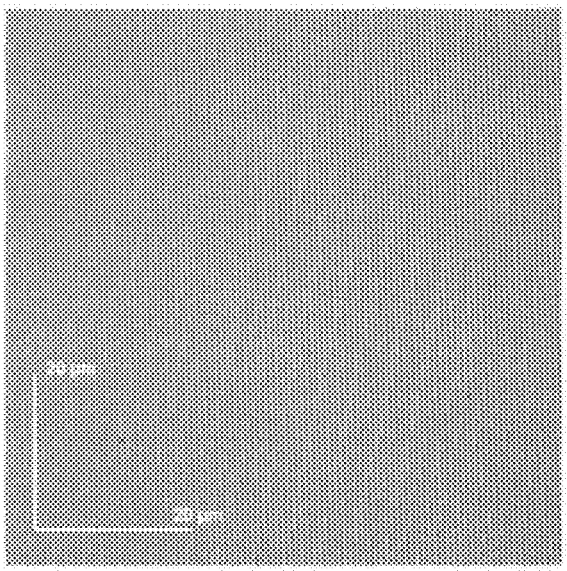
FIGS. 2A and 2B show optical micrographs of different resolutions of patterned surface obtained from a composition embodiment of this invention.
Figure 2B:
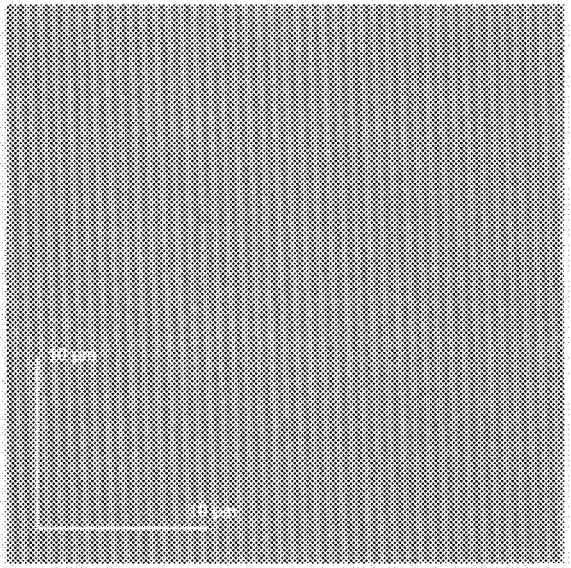

In a glass bottle, Component A was prepared by dissolving Ru-5 (1 molar part) and ITX (2 molar parts) in DCPD (8,000 molar parts) to form a clear solution. In a separate glass bottle, Component B was prepared by dissolving Rhodorsil 2074 (2 molar parts) in NBEtO-2-PhPh (2,000 molar parts). Both Component A and Component B were then mixed together and purged with nitrogen for 2 hours. A DVD (Verbatim) was separated using a razor blade and cleaned with methanol to expose the channel patterned surface. FIG. 1 shows the optical micrograph of the exposed channel patterns of the DVD. The mixed solution of Components A and B was then poured on a glass substrate and covered with the exposed channel patterned surface of the DVD facing the solution. The sandwiched glass substrate and the DVD was then exposed to UV light (500 mW/cm$^2$ for 4 seconds). The cured film was peeled off from the DVD and the glass substrate, and characterized by optical microscopy. FIG. 2 shows the channel surface imprinted on the film formed from the composition of this invention. This clearly demonstrates that the composition of this invention can be used for forming nanoimprints.

The following Comparative Examples 1 to 3 illustrate that a photoacid generators are needed to effectively activate the ruthenium carbide catalysts. In some of these Comparative Examples use of photosensitizer alone is also found to be ineffective to cause polymerization.

Comparative Example 1

The procedures of Example 5 was substantially repeated in this Comparative Example 1 except that photosensitizer was not used in the formulation. Total heat of reaction from UV DSC was less than 10 J/g.

Comparative Example 2

The procedures of Example 4 was substantially repeated in this Comparative Example 2 except that Rhodorsil 2074 and photosensitizer were not used in the formulation. Total heat of reaction from UV DSC was 60 J/g. It indicates that the catalyst Ru-1 became moderately active under these conditions, however, this composition also exhibited poor shelf life stability.

Comparative Example 3

The procedures of Example 12 were substantially repeated in this Comparative Example 3 except that CPTX was not added to the solution. The solution was kept overnight at r.t. but viscosity was not changed. The solution remained in a liquid form and dripped from the nozzle during UV light exposure.

Although the invention has been illustrated by certain of the preceding examples, it is not to be construed as being limited thereby; but rather, the invention encompasses the generic area as hereinbefore disclosed. Various modifications and embodiments can be made without departing from the spirit and scope thereof.

What is claimed is:

1. A two component composition comprising component A and component B, wherein component A contains a latent organo-ruthenium carbide catalyst and component B contains a photoactive or a thermoactive acid generator and either of the component A or the component B further comprising:

a) one or more monomers of formula (I):

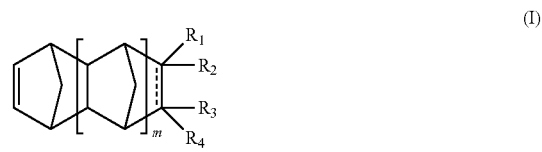

(I)

wherein:

m is an integer 0, 1 or 2;

═ is a single bond or a double bond;

$R_1$, $R_2$, $R_3$ and $R_4$ are the same or different and each independently selected from the group consisting of hydrogen, halogen, methyl, ethyl, linear or branched $(C_3-C_{16})$alkyl, $(C_2-C_{16})$alkenyl, perfluoro$(C_1-C_{12})$alkyl, $(C_3-C_{12})$cycloalkyl, $(C_6-C_{12})$bicycloalkyl, $(C_7-C_{14})$tricycloalkyl, methoxy, ethoxy, linear or branched $(C_3-C_{16})$alkoxy, $(C_2-C_6)$acyl, $(C_2-C_6)$acyloxy, perfluoro($C_6$-$C_{14}$)aryl, perfluoro($C_6$-$C_{14}$)aryl($C_1$-$C_3$)alkyl, ($C_6$-$C_{14}$)aryloxy, ($C_6$-$C_{14}$)aryl($C_1$-$C_6$)alkoxy, tri($C_1$-$C_6$)alkoxysilyl and a group of formula (A):

—Z-Aryl (A)

wherein:
Z is a bond or a group selected from the group consisting of:
$(CR_5R_6)_a$, $O(CR_5R_6)_a$, $(CR_5R_6)_aO$, $(CR_5R_6)_a$—O—$(CR_5R_6)_b$, $(CR_5R_6)_a$—O—$(SiR_5R_6)_b$, $(CR_5R_6)_a$—(CO)O—$(CR_5R_6)_b$, $(CR_5R_6)_a$—O(CO)—$(CR_5R_6)_b$, $(CR_5R_6)_a$—(CO)—$(CR_5R_6)_b$, where a and b are integers which may be the same or different and each independently is 1 to 12;
$R_5$ and $R_6$ are the same or different and each independently selected from the group consisting of hydrogen, methyl ethyl, linear or branched ($C_3$-$C_6$)alkyl, methoxy, ethoxy, linear or branched ($C_3$-$C_6$)alkyloxy, ($C_2$-$C_6$)acyl, ($C_2$-$C_6$)acyloxy, phenyl and phenoxy;
Aryl is selected from the group consisting of phenyl, biphenyl and naphthyl, where the aryl is optionally substituted with one or more of groups selected from the group consisting of methyl, ethyl, linear or branched ($C_3$-$C_6$)alkyl, hydroxy, methoxy, ethoxy, linear or branched ($C_3$-$C_6$)alkyloxy, ($C_2$-$C_6$)acyl, ($C_2$-$C_6$)acyloxy, phenyl and phenoxy; or
one of $R_1$ or $R_2$ taken together with one of $R_3$ or $R_4$ and the carbon atoms to which they are attached to form a ($C_5$-$C_7$)carbocyclic ring optionally containing one or more double bonds; and
b) a photoactive compound; and
wherein said latent organo-ruthenium carbide catalyst is of formula (III):

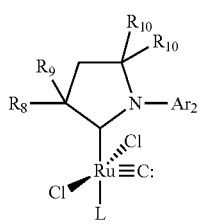

(III)

wherein:
L is $PR_3$, where R is independently selected from the group consisting of isopropyl, sec-butyl, tert-butyl, cyclohexyl, bicyclo($C_5$-$C_{10}$)alkyl, phenyl, benzyl, iso-propoxy, sec-butoxy, tert-butoxy, cyclohexyloxy, phenoxy and benzyloxy;
$R_8$ and $R_9$ are the same or different and each independently selected from the group consisting of hydrogen, methyl, ethyl, linear or branched ($C_1$-$C_6$)alkyl, ($C_6$-$C_{10}$)aryl, methoxy, ethoxy, linear or branched ($C_1$-$C_6$)alkoxy, ($C_6$-$C_{10}$)aryloxy, —NHCO($C_1$-$C_6$)alkyl, —NHCO-perfluoro($C_1$-$C_6$)alkyl, —$SO_2N$(($C_1$-$C_6$)alkyl)$_2$ and —$NO_2$; or
$R_8$ and $R_9$ taken together with the carbon atom to which they are attached to form a ($C_3$-$C_7$)cycloalkyl ring;
each $R_{10}$ is independently selected from the group consisting of hydrogen, methyl, ethyl and linear or branched ($C_1$-$C_6$)alkyl;
$Ar_2$ is selected from the group consisting of substituted or unsubstituted phenyl, substituted or unsubstituted biphenyl and substituted or unsubstituted naphthyl;

wherein said substituents are selected from the group consisting of methyl, ethyl, iso-propyl, tert-butyl and phenyl; and
wherein said component A and component B are in a clear liquid form at room temperature.

2. The composition according to claim 1, wherein either of the component A or the component B further comprising one or more monomers of formula (IV):

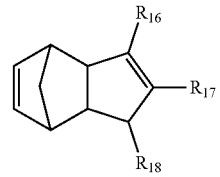

(IV)

wherein
$R_{16}$ and $R_{17}$ are the same or different and each independently selected from the group consisting of hydrogen, methyl ethyl, linear or branched ($C_3$-$C_6$)alkyl, methoxy, ethoxy, linear or branched ($C_3$-$C_6$)alkyloxy, acetoxy, ($C_2$-$C_6$)acyl, phenyl and phenoxy; or
$R_{16}$ taken together with $R_{17}$ and the carbon atoms to which they are attached to form a ($C_5$-$C_7$)carbocyclic ring optionally containing one or more double bonds;
$R_{18}$ is hydrogen, halogen, methyl, ethyl, linear or branched ($C_3$-$C_{16}$)alkyl, ($C_6$-$C_{10}$)aryl, ($C_6$-$C_{10}$)aryl ($C_1$-$C_6$)alkyl, hydroxy, methoxy, ethoxy, linear or branched ($C_3$-$C_{16}$)alkoxy, ($C_6$-$C_{10}$)aryloxy, ($C_6$-$C_{10}$)aryl($C_1$-$C_6$)alkoxy, —$O(CO)R_{19}$ and —$O(CO)OR_{19}$, where $R_{19}$ is methyl, ethyl, linear or branched ($C_3$-$C_{16}$) alkyl, ($C_6$-$C_{10}$)aryl and ($C_6$-$C_{10}$)aryl($C_1$-$C_6$)alkyl.

3. The composition according to claim 1, wherein either of the component A or the component B comprising first and second monomer of formula (I) distinct from each other and one of said first and second monomers having a viscosity below 50 centipoise at 25° C., and wherein said first monomer is completely miscible with said second monomer to form a clear solution.

4. The composition according to claim 1, wherein said composition comprising a monomer of formula (I) wherein m is 1 and each of $R_1$, $R_2$, $R_3$ and $R_4$ are hydrogen.

5. The composition according to claim 1, wherein said composition comprising first and second monomer of formula (I) distinct from each other, wherein said first monomer is of formula (I) wherein m is 1 and each of $R_1$, $R_2$, $R_3$ and $R_4$ are hydrogen; and wherein said second monomer is of formula (I) wherein m is 0, $R_1$ is decyl and each of $R_2$, $R_3$ and $R_4$ are hydrogen.

6. The composition according to claim 1, wherein the monomer of formula (I) is selected from the group consisting of:

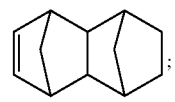

tetracyclododecene

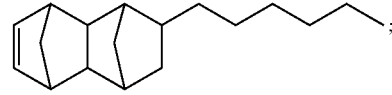

2-hexyl-1,2,3,4a,5,8,8a-octahydro-1,4:5,8-dimethanonaphthalene

-continued

tetracyclododecadiene

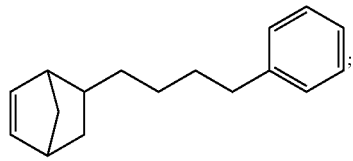

5-(4-phenylbutyl)bicyclo[2.2.1]hept-2-ene

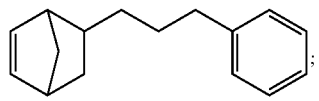

5-(3-phenylpropyl)bicyclo[2.2.1]
hept-2-ene

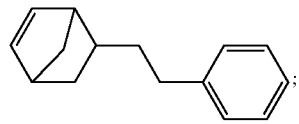

5-phenetylbicyclo[2.2.1]hept-2-ene

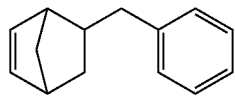

5-benzylbicyclo[2.2.1]hept-2-ene

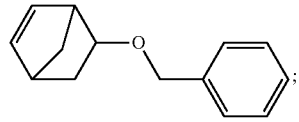

5-benzyloxy)bicyclo[2.2.1]
hept-2-ene

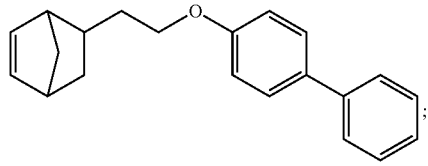

5-(2-([1,1'-biphenyl]-4-yloxy)ethyl)bicyclo[2.2.1]
hept-2-ene

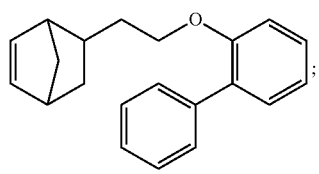

5-(2([1,1'-biphenyl]-2-yloxy)ethyl)
bicyclo[2,2,1]hept-2ene

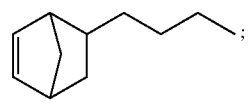

5-butylbicyclo[2.2.1]hept-2-ene

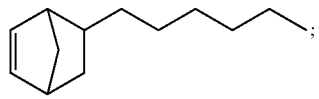

5-hexylbicyclo[2.2.1]hept-2-ene

-continued

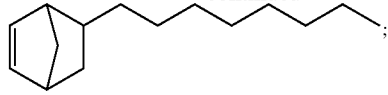

5-octylbicyclo[2.2.1]hept-2-ene

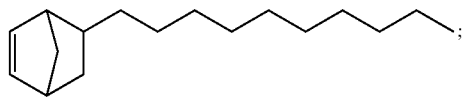

5-decylbicyclo[2.2.1]hept-2-ene

5-ethylidenebicyclo
[2.2.1]hept-2-ene 2-ethylidene-1,2,3,4,4a,5,8,8a-
octahydro-1,4;5,8-
dimethanonaphthalene

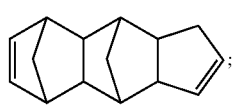

3a,4,4a,5,8,8a,9,9a-
octahydro-1H-4,9:5,8-
dimethanocyclopenta[b]
naphthalene

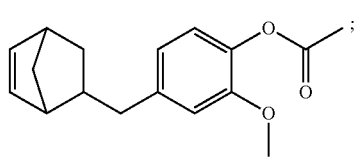

5-norbornenylmethyleugenyl acetate

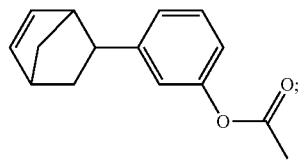

3-(bicyclo[2.2.1]hept-5-en-2-yl)
phenyl acetate

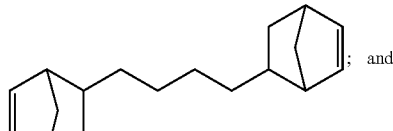

; and 1,4-di(bicyclo[2.2.1]hept-5-en-2-yl)
butane (NBBuNB)

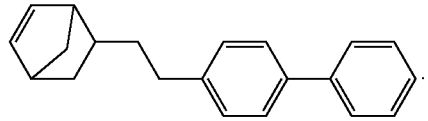

5-(2-([1,1'-biphenyl]-4-yl)ethyl)bicyclo
[2.2.1]hept-2-ene

7. The composition according to claim 1 comprising one or more monomers of formula (IV), which is selected from the group consisting of:

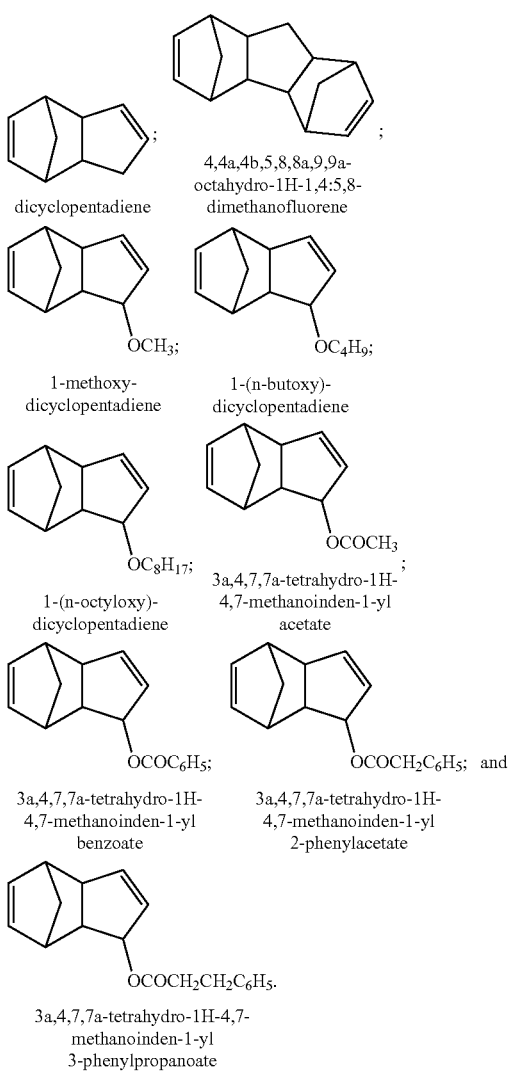

dicyclopentadiene 4,4a,4b,5,8,8a,9,9a-octahydro-1H-1,4:5,8-dimethanofluorene 1-methoxy-dicyclopentadiene 1-(n-butoxy)-dicyclopentadiene 1-(n-octyloxy)-dicyclopentadiene 3a,4,7,7a-tetrahydro-1H-4,7-methanoinden-1-yl acetate 3a,4,7,7a-tetrahydro-1H-4,7-methanoinden-1-yl benzoate 3a,4,7,7a-tetrahydro-1H-4,7-methanoinden-1-yl 2-phenylacetate; and 3a,4,7,7a-tetrahydro-1H-4,7-methanoinden-1-yl 3-phenylpropanoate.

8. The composition according to claim 2, wherein said one or more monomer of formula (I) is selected from the group consisting of:
tetracyclododecene (TD);
5-butylbicyclo[2.2.1]hept-2-ene (BuNB);
5-hexylbicyclo[2.2.1]hept-2-ene (HexylNB);
5-decylbicyclo[2.2.1]hept-2-ene (DecylNB);
5-phenethylbicyclo[2.2.1]hept-2-ene (PENB);
5-(2-([1,1'-biphenyl]-4-yloxy)ethyl)bicyclo[2.2.1]hept-2-ene; and
5-(2-([1,1'-biphenyl]-2-yloxy)ethyl)bicyclo[2.2.1]hept-2-ene (NBEtO-2-PhPh);
and wherein said monomer of formula (N) is dicyclopentadiene (DCPD); and mixtures in any combination thereof.

9. The composition according to claim 1, wherein:
L is $PR_3$, where R is independently selected from the group consisting of isopropyl, sec-butyl, tert-butyl, cyclohexyl and phenyl;
each $R_8$, $R_9$ and $R_{10}$ is independently selected from the group consisting of hydrogen, methyl, ethyl, n-propyl, iso-propyl and phenyl;

$Ar_2$ is selected from the group consisting of 2,4-dimethylphenyl, 2,4-diethylphenyl, 2,4-diisopropylphenyl and 2,4,6-trimethylphenyl.

10. The composition according to claim 1, wherein the organo-ruthenium carbide is selected from the group consisting of:

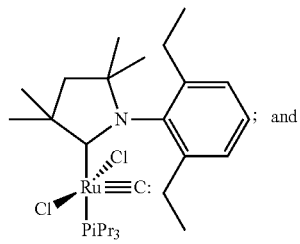

1-(2,6-diethylphenyl)-3,3,5,5,-tetramethylpyrrolidin-2-ylidene-triisopropylphosphine ruthenium carbide dichloride

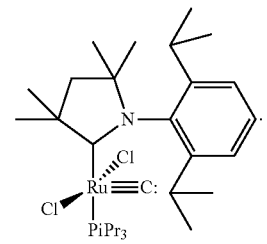

1-(2,6-diisopropylphenyl)-3,3,5,5,-tetramethylpyrrolidin-2-ylidene-triisopropylphosphine ruthenium carbide dichloride 11. The composition according to claim 1, wherein the composition comprises a photoactive compound selected from the group consisting of:
a compound of the formula (V):

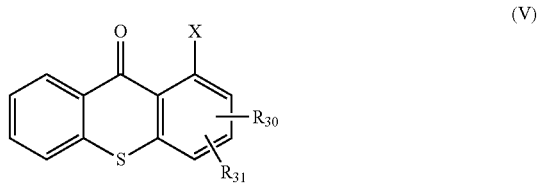

wherein
X is hydrogen or chlorine;
$R_{30}$ and $R_{31}$ are the same or different and independently of each other selected from the group consisting of hydrogen, chlorine, methyl, ethyl, linear or branched ($C_3$-$C_{12}$)alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_3$)alkyl, ($C_1$-$C_{12}$)alkoxy, ($C_3$-$C_{12}$)cycloalkoxy, ($C_6$-$C_{12}$)bicycloalkoxy, ($C_7$-$C_{14}$)tricycloalkoxy, ($C_6$-$C_{10}$)aryloxy($C_1$-$C_3$)alkyl and ($C_6$-$C_{10}$)-aryloxy; and a compound of the formula (VI):

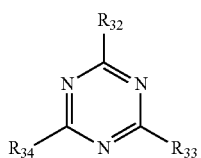

wherein
$R_{32}$, $R_{33}$ and $R_{34}$ are the same or different and independently of each other selected from the group consisting of halogen, methyl, ethyl, linear or branched ($C_3$-$C_{12}$) alkyl, trihalomethyl, pentahaloethyl, linear or branched perhalo($C_3$-$C_{12}$)alkyl, ($C_6$-$C_{10}$)aryl, ($C_6$-$C_{10}$)aryl($C_1$-$C_3$)alkyl, perhalo($C_6$-$C_{10}$)aryl, perhalo($C_6$-$C_{10}$)arylperhalo($C_1$-$C_3$)alkyl, substituted or unsubstituted five membered or six membered heteroaryl($C_2$-$C_4$)alkenyl and substituted or unsubstituted ($C_6$-$C_{10}$)aryl($C_2$-$C_4$) alkenyl provided that one of $R_{32}$, $R_{33}$ and $R_{34}$ is trihalomethyl, pentahaloethyl, linear or branched perhalo($C_3$-$C_{12}$)alkyl.

12. The composition according to claim 11, wherein the photoactive compound is selected from the group consisting of:

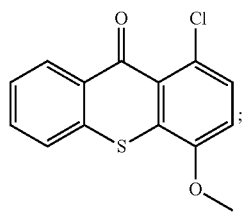

1-chloro-4-methoxy-9H-thioxanthen-9-one

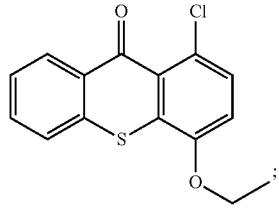

1-chloro-4-ethoxy-9H-thioxanthen-9-one

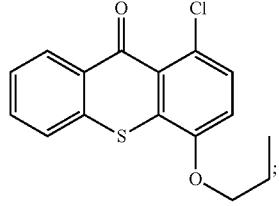

1-chloro-4-propoxy-9H-thioxanthen-9-one

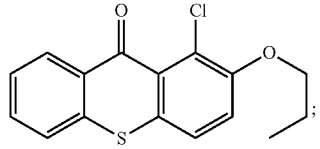

1-chloro-4-propoxy-9H-thioxanthen-9-one

-continued

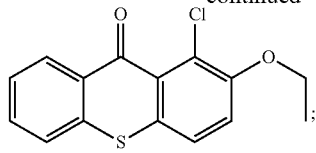

1-chloro-2-ethoxy-9H-thioxanthen-9-one

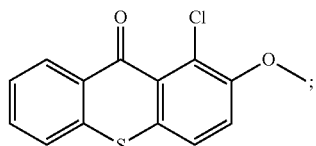

1-chloro-2-methoxy-9H-thioxanthen-9-one

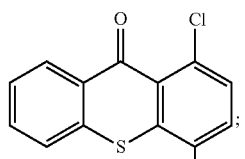

1-chloro-4-methyl-9H-thioxanthen-9-one

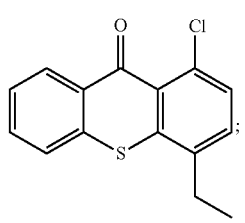

1-chloro-4-ethyl-9H-thioxanthen-9-one

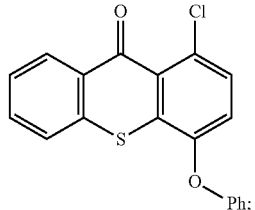

1-chloro-4-phenoxy-9H-thioxanthen-9-one

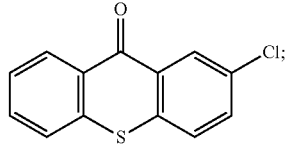

2-chlorothioxanthen-9-one (CTX)

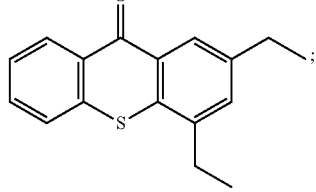

2,4-diethylthioxanthone (DETX)

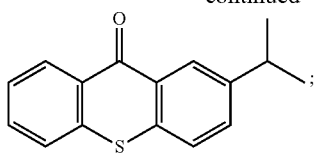

2-isopropylthioxanthone

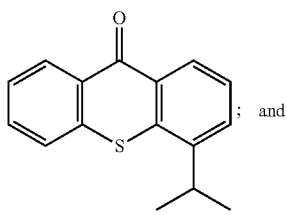

4-isopropylthioxanthone (ITX)

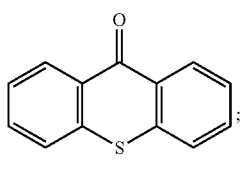

thioxanthone (TX)

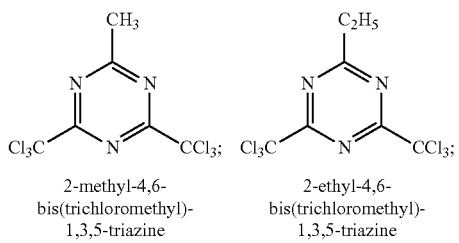

2-methyl-4,6-bis(trichloromethyl)-1,3,5-triazine   2-ethyl-4,6-bis(trichloromethyl)-1,3,5-triazine

2-methyl-4,6-bis(tribromomethyl)-1,3,5-triazine   2-(2-(furan-2-yl)vinyl)-4,6-bis(trichloromethyl)-1,3,5-triazine

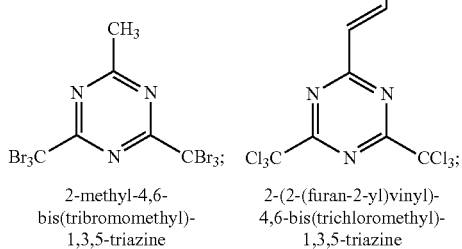

2-(2-(thiophen-2-yl)vinyl)-4,6-bis(trichloromethyl)-1,3,5-triazine   2-(4-methoxystyryl)-4,6-bis(trichloromethyl)-1,3,5-triazine; and

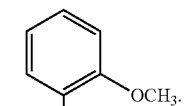

2-(2-methoxystyryl)-4,6-bis(trichloromethyl)-1,3,5-triazine

13. The composition according to claim 1, wherein the photoactive or thermoactive acid generator is of the formula (VI) or of the formula (VII):

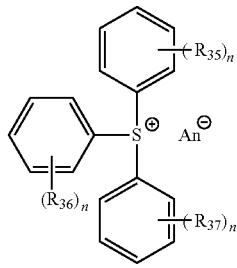

(VII₁)

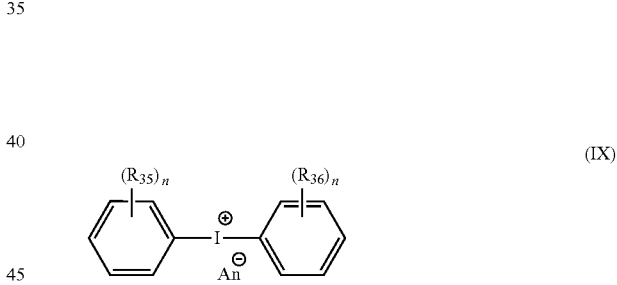

(IX)

wherein n is an integer from 0 to 5;

$An^{\ominus}$ is selected from the group consisting of $Cl^{\ominus}$, $Br^{\ominus}$, $I^{\ominus}$, $BF_4^{\ominus}$, $B(C_6F_5)_4^{\ominus}$, $PF_6^{\ominus}$, $n\text{-}C_4F_9SO_3^{\ominus}$, $CF_3SO_3^{\ominus}$ and $p\text{-}CH_3(C_6H_4)\text{---}SO_3^{\ominus}$;

$R_{35}$, $R_{36}$ and $R_{37}$ are the same or different and independently of each other selected from the group consisting of chlorine, methyl, ethyl, linear or branched ($C_3$-$C_{20}$) alkyl, ($C_3$-$C_{12}$)cycloalkyl, ($C_6$-$C_{12}$)bicycloalkyl, ($C_7$-$C_{14}$)tricycloalkyl, ($C_6$-$C_{10}$)aryl, ($C_6$-$C_{10}$)aryl($C_1$-$C_3$)alkyl, ($C_3$-$C_{12}$)alkoxy, ($C_3$-$C_{12}$)cycloalkoxy, ($C_6$-$C_{12}$) bicycloalkoxy, ($C_7$-$C_{14}$)tricycloalkoxy, ($C_6$-$C_{10}$) aryloxy($C_1$-$C_3$)alkyl, ($C_6$-$C_{10}$)-aryloxy, ($C_6$-$C_{10}$)-thioaryl and ($C_6$-$C_{10}$)-thioaryl-($C_6$-$C_{10}$) diarylsulfonium salt.

14. The composition according to claim 13, wherein the photoactive or thermoactive acid generator is selected from the group consisting of:

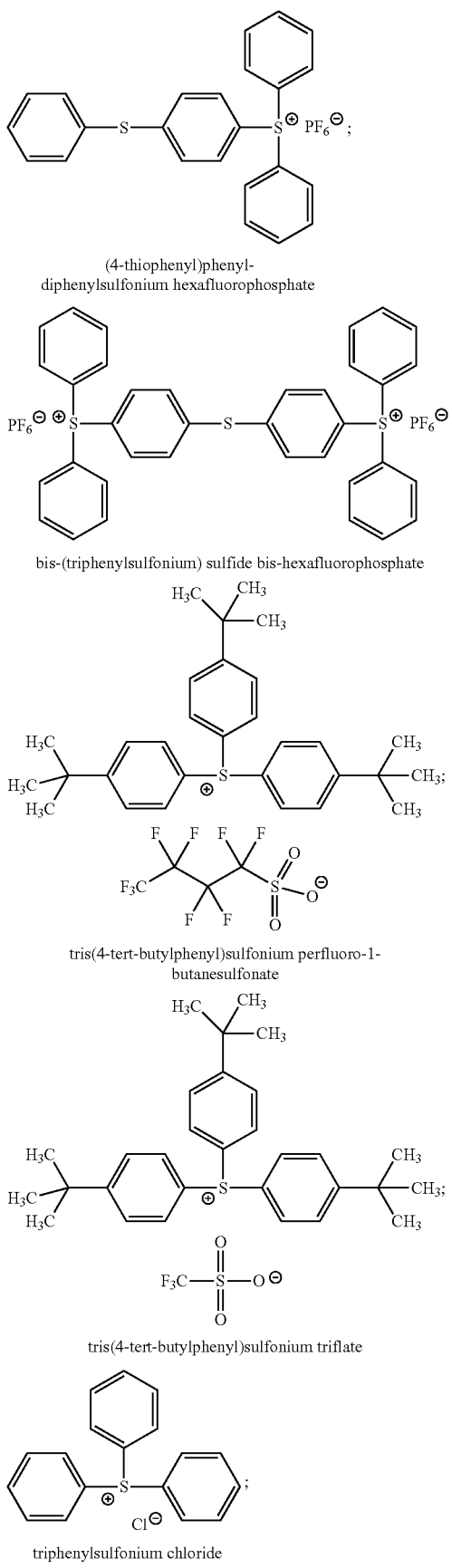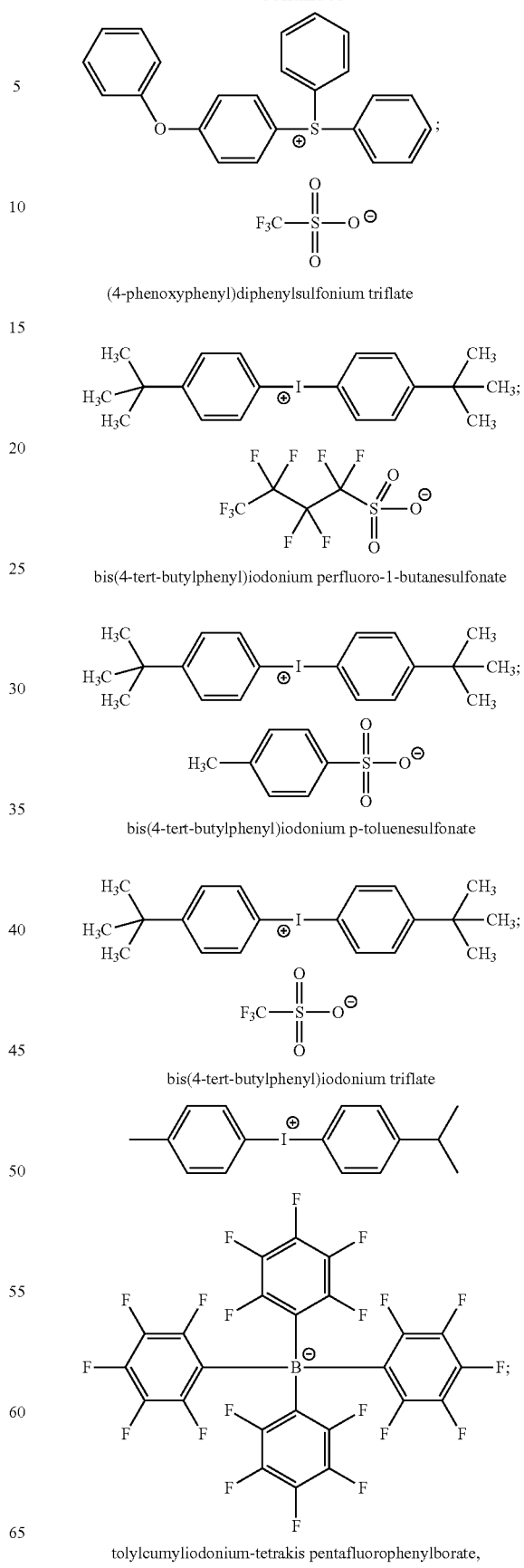

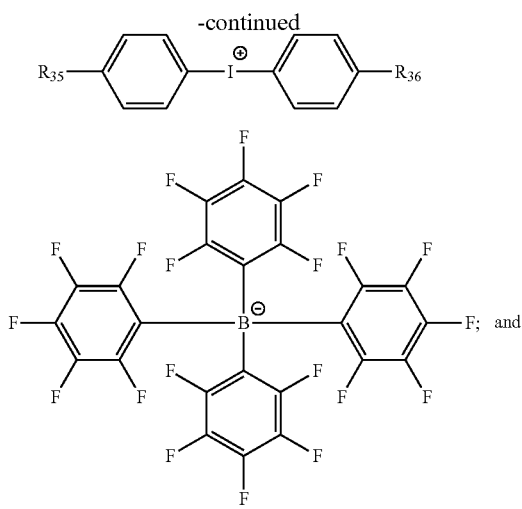

where $R_{35}$ and $R_{36}$ are the same or different and each independently selected from linear or branched $(C_{10}\text{-}C_{13})$alkyl

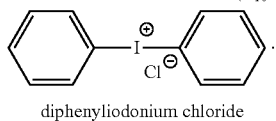

diphenyliodonium chloride

15. The composition according to claim 1, which is selected from the group consisting of:

component A containing a mixture of 5-phenethylbicyclo[2.2.1]hept-2-ene, 1-(2, 6-diethylphenyl)-3,3,5,5-tetramethylpyrrolidin-2-ylidene-triisopropylphosphine ruthenium carbide dichloride and 1-chloro-4-propoxy-9H-thioxanthen-9-one, and component B containing tolylcumyliodonium-tetrakis pentafluorophenylborate and toluene;

component A containing a mixture of 5-phenethylbicyclo[2.2.1]hept-2-ene, 1-(2,6-diisopropylphenyl)-3,3,5,5-tetramethylpyrrolidin-2-ylidene-triisopropylphosphine ruthenium carbide dichloride and 1-chloro-4-propoxy-9H-thioxanthen-9-one, and component B containing tolylcumyliodonium-tetrakis pentafluorophenylborate and toluene;

component A containing a mixture of 5-phenethylbicyclo[2.2.1]hept-2-ene, dicyclopentadiene, 1-(2,6-diethylphenyl)-3,3,5,5-tetramethylpyrrolidin-2-ylidene-triisopropylphosphine ruthenium carbide dichloride and 1-chloro-4-propoxy-9H-thioxanthen-9-one, and component B containing a mixture of 5-(2-([1,1'-biphenyl]-2-yloxy)ethyl)bicyclo[2.2.1]hept-2-ene and tolylcumyliodonium-tetrakis pentafluorophenylborate; and component A containing a mixture of 2-hexyl-1,2,3,4,4a,5,8,8a-octahydro-1,4:5,8-dimethanonaphthalene, 3a,4, 4a,5,8,8a,9,9a-octahydro-1H-4,9:5, 8-dimethanocyclopenta[b]naphthalene, 1-(2,6-diethylphenyl)-3,3,5, 5-tetramethylpyrrolidin-2-ylidene-triisopropylphosphine ruthenium carbide dichloride and 4-isopropylthioxanthone, and component B containing a mixture of 2-hexyl-1,2,3,4,4a,5,8,8a-octahydro-1,4:5,8-dimethanonaphthalene, 3a,4,4a,5,8,8a,9,9a-octahydro-1H-4,9:5,8-dimethanocyclopenta[b]naphthalene and bis(4-decylphenyl) iodonium-tetrakis pentafluorophenylborate.

16. A kit for forming a three dimensional object comprising component A and component B, wherein component A contains a latent organo-ruthenium carbide catalyst and component B contains a photoactive or a thermoactive acid generator and either of the component A or the component B further comprising:

a) one or more monomers of formula (I):

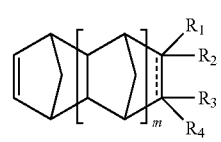

wherein:

m is an integer 0, 1 or 2;

═══ is a single bond or a double bond;

$R_1$, $R_2$, $R_3$ and $R_4$ are the same or different and each independently selected from the group consisting of hydrogen, halogen, methyl, ethyl, linear or branched $(C_3\text{-}C_{16})$alkyl, $(C_2\text{-}C_{16})$alkenyl, perfluoro$(C_1\text{-}C_{12})$alkyl, $(C_3\text{-}C_{12})$cycloalkyl, $(C_6\text{-}C_{12})$bicycloalkyl, $(C_7\text{-}C_{14})$tricycloalkyl, methoxy, ethoxy, linear or branched $(C_3\text{-}C_{16})$alkoxy, $(C_2\text{-}C_6)$acyl, $(C_2\text{-}C_6)$acyloxy, $(C_6\text{-}C_{14})$aryl, $(C_6\text{-}C_{14})$aryl$(C_1\text{-}C_6)$alkyl, perfluoro$(C_6\text{-}C_{14})$aryl, perfluoro$(C_6\text{-}C_{14})$aryl$(C_1\text{-}C_3)$alkyl, $(C_6\text{-}C_{14})$aryloxy, $(C_6\text{-}C_{14})$aryl$(C_1\text{-}C_6)$alkoxy, tri$(C_1\text{-}C_6)$alkoxysilyl and a group of formula (A):

—Z-Aryl    (A)

wherein:

Z is a bond or a group selected from the group consisting of:

$(CR_5R_6)_a$, $O(CR_5R_6)_a$, $(CR_5R_6)_aO$, $(CR_5R_6)_a$—O—$(CR_5R_6)_b$, $(CR_5R_6)_a$—O—$(SiR_5R_6)_b$, $(CR_5R_6)_a$—(CO)O—$(CR_5R_6)_b$, $(CR_5R_6)_a$—O(CO)—$(CR_5R_6)_b$, $(CR_5R_6)_a$—(CO)—$(CR_5R_6)_b$, where a and b are integers which may be the same or different and each independently is 1 to 12;

$R_5$ and $R_6$ are the same or different and each independently selected from the group consisting of hydrogen, methyl ethyl, linear or branched $(C_3\text{-}C_6)$alkyl, methoxy, ethoxy, linear or branched $(C_3\text{-}C_6)$alkyloxy, $(C_2\text{-}C_6)$acyl, $(C_2\text{-}C_6)$acyloxy, phenyl and phenoxy;

Aryl is phenyl or phenyl substituted with one or more of groups selected from the group consisting of methyl, ethyl, linear or branched $(C_3\text{-}C_6)$alkyl, hydroxy, methoxy, ethoxy, linear or branched $(C_3\text{-}C_6)$alkyloxy, $(C_2\text{-}C_6)$acyl, $(C_2\text{-}C_6)$acyloxy, phenyl and phenoxy; or one of $R_1$ or $R_2$ taken together with one of $R_3$ or $R_4$ and the carbon atoms to which they are attached to form a $(C_5\text{-}C_7)$carbocyclic ring optionally containing one or more double bonds;

b) optionally one or more monomers of formula (IV):

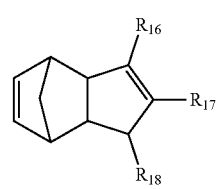

wherein

R$_{16}$ and R$_{17}$ are the same or different and each independently selected from the group consisting of hydrogen, methyl ethyl, linear or branched (C$_3$-C$_6$)alkyl, methoxy, ethoxy, linear or branched (C$_3$-C$_6$)alkyloxy, acetoxy, (C$_2$-C$_6$)acyl, phenyl and phenoxy; or R$_{16}$ taken together with R$_{17}$ and the carbon atoms to which they are attached to form a (C$_5$-C$_7$)carbocyclic ring optionally containing one or more double bonds;

R$_{18}$ is hydrogen, halogen, methyl, ethyl, linear or branched (C$_3$-C$_{16}$)alkyl, (C$_6$-C$_{10}$)aryl, (C$_6$-C$_{10}$)aryl(C$_1$-C$_6$)alkyl, hydroxy, methoxy, ethoxy, linear or branched (C$_3$-C$_{16}$)alkoxy, (C$_6$-C$_{10}$)aryloxy, (C$_6$-C$_{10}$)aryl(C$_1$-C$_6$)alkoxy, —O(CO)R$_{19}$ and —O(CO)OR$_{19}$, where R$_{19}$ is methyl, ethyl, linear or branched (C$_3$-C$_{16}$) alkyl, (C$_6$-C$_{10}$)aryl and (C$_6$-C$_{10}$)aryl(C$_1$-C$_6$)alkyl; and c) a compound of the formula (V):

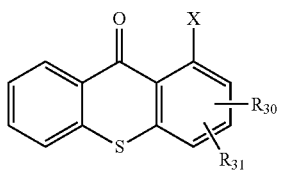

(V)

wherein

X is hydrogen or chlorine;

R$_{30}$ and R$_{31}$ are the same or different and independently of each other selected from the group consisting of hydrogen, chlorine, methyl, ethyl, linear or branched (C$_3$-C$_{12}$)alkyl, (C$_3$-C$_{12}$)cycloalkyl, (C$_6$-C$_{12}$)bicycloalkyl, (C$_7$-C$_{14}$)tricycloalkyl, (C$_6$-C$_{10}$)aryl, (C$_6$-C$_{10}$)aryl(C$_1$-C$_3$)alkyl, (C$_1$-C$_{12}$)alkoxy, (C$_3$-C$_{12}$)cycloalkoxy, (C$_6$-C$_{12}$)bicycloalkoxy, (C$_7$-C$_{14}$)tricycloalkoxy, (C$_6$-C$_{10}$)aryloxy(C$_1$-C$_3$)alkyl and (C$_6$-C$_{10}$)-aryloxy;

wherein said latent organo-ruthenium carbide catalyst is of formula (III):

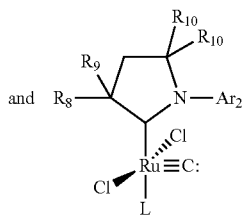

(III)

wherein:

L is PR$_3$, where R is independently selected from the group consisting of isopropyl, sec-butyl, tert-butyl, cyclohexyl, bicyclo(C$_5$-C$_{10}$)alkyl, phenyl, benzyl, isopropoxy, sec-butoxy, tert-butoxy, cyclohexyloxy, phenoxy and benzyloxy;

R$_8$ and R$_9$ are the same or different and each independently selected from the group consisting of hydrogen, methyl, ethyl, linear or branched (C$_1$-C$_6$)alkyl, (C$_6$-C$_{10}$)aryl, methoxy, ethoxy, linear or branched (C$_1$-C$_6$) alkoxy, (C$_6$-C$_{10}$)aryloxy, —NHCO(C$_1$-C$_6$)alkyl, —NHCO-perfluoro(C$_1$-C$_6$)alkyl, —SO$_2$N((C$_1$-C$_6$)alkyl)$_2$ and —NO$_2$; or R$_8$ and R$_9$ taken together with the carbon atom to which they are attached to form a (C$_3$-C$_7$)cycloalkyl ring;

each R$_{10}$ is independently selected from the group consisting of hydrogen, methyl, ethyl and linear or branched (C$_1$-C$_6$)alkyl;

Ar$_2$ is selected from the group consisting of substituted or unsubstituted phenyl, substituted or unsubstituted biphenyl and substituted or unsubstituted naphthyl;

wherein said substituents are selected from the group consisting of methyl, ethyl, iso-propyl, tert-butyl and phenyl; and wherein said component A and component B are in a clear liquid form at room temperature.

17. The kit according to claim 16, which contains a compound of formula (V) selected from the group consisting of:

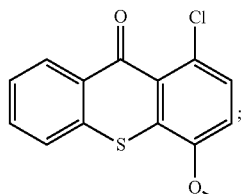

1-chloro-4-methoxy-9H-thioxanthen-9-one

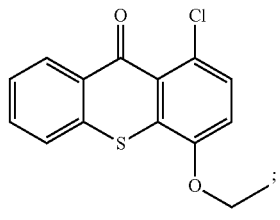

1-chloro-4-ethoxy-9H-thioxanthen-9-one

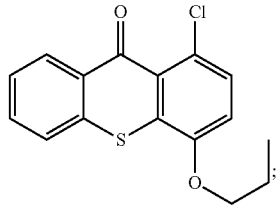

1-chloro-4-propoxy-9H-thioxanthen-9-one

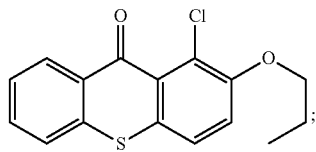

1-chloro-2-propoxy-9H-thioxanthen-9-one

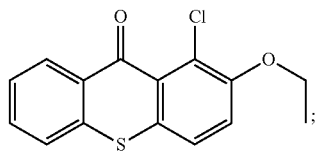

1-chloro-2-ethoxy-9H-thioxanthen-9-one

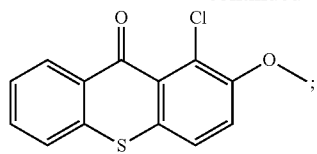

1-chloro-2-methoxy-9H-
thioxanthen-9-one

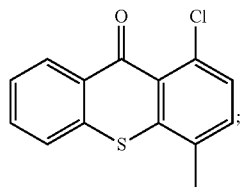

1-chloro-4-methyl-9H-
thioxanthen-9-one

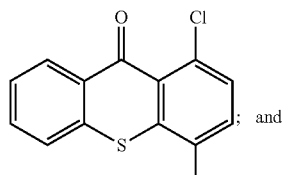

; and 1-chloro-4-ethyl-9H-
thioxanthen-9-one

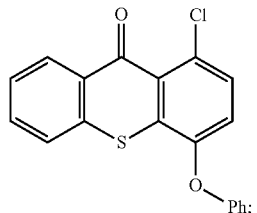

1-chloro-4-phenoxy-9H-
thioxanthen-9-one

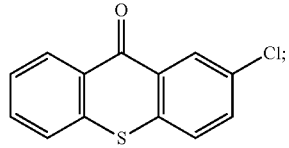

2-chlorothioxanthen-9-one (CTX)

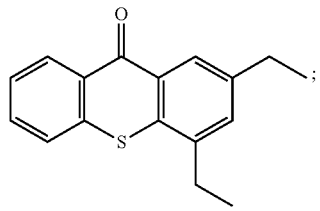

2,4-diethylthioxanthone (DETX)

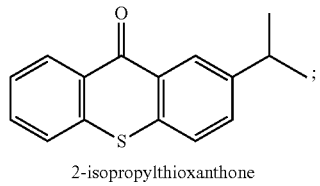

2-isopropylthioxanthone

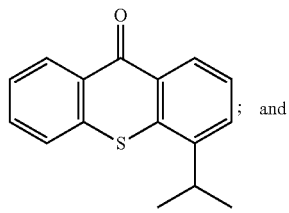

; and 4-isopropylthioxanthone (ITX)

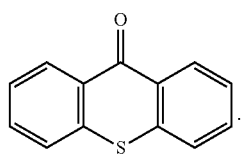

thioxanthone (TX)

18. The kit according to claim 16, wherein the photoactive acid generator is selected from the group consisting of:

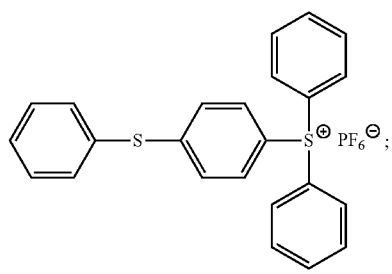

(4-thiophenyl)phenyl-
diphenylsulfonium hexafluorophosphate

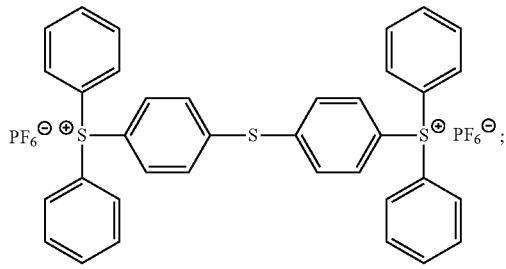

bis-(triphenylsulfonium) sulfide bis-hexafluorophosphate

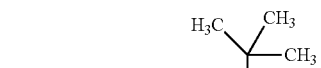

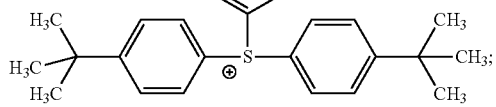

tris(4-tert-butylphenyl)sulfonium perfluoro-1-
butanesulfonate

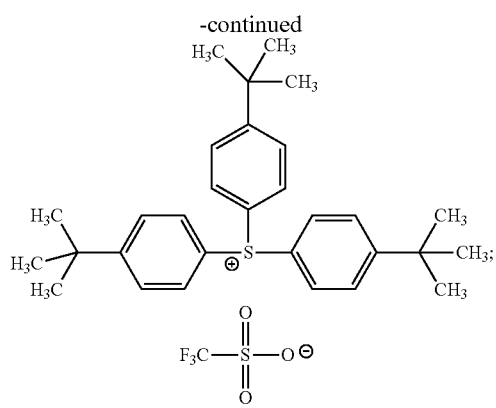
tris(4-tert-butylphenyl)sulfonium triflate

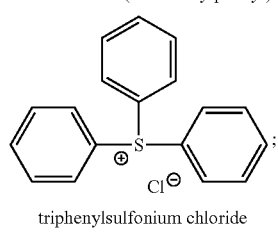
triphenylsulfonium chloride

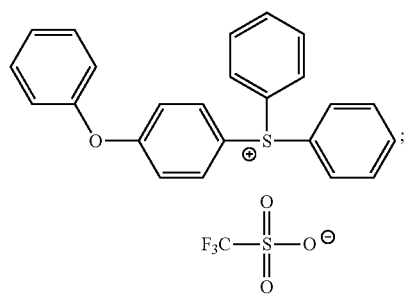
(4-phenoxyphenyl)diphenylsulfonium triflate

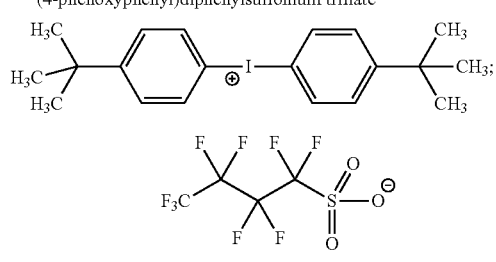
bis(4-tert-butylphenyl)iodonium perfluoro-1-butanesulfonate

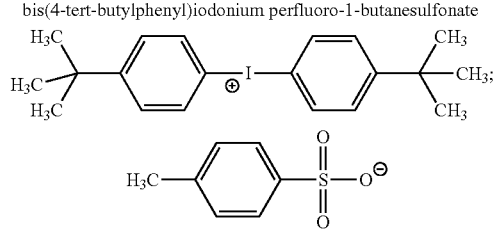
bis(4-tert-butylphenyl)iodonium p-toluenesulfonate

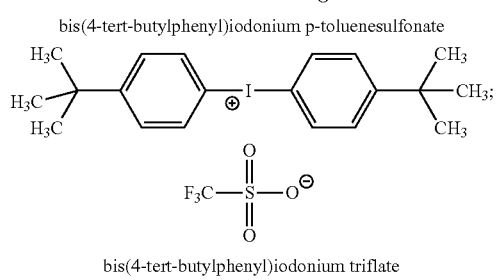
bis(4-tert-butylphenyl)iodonium triflate

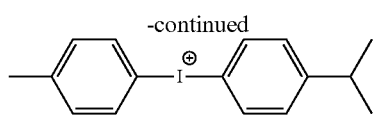

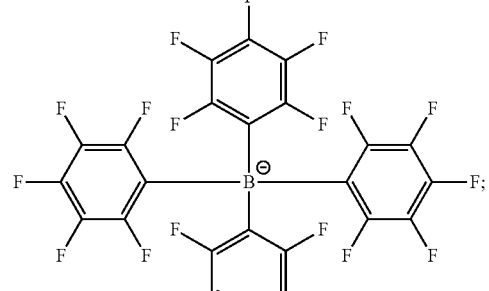
tolylcumyliodonium-tetrakis pentafluorophenylborate

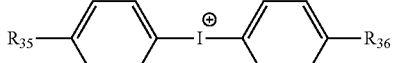

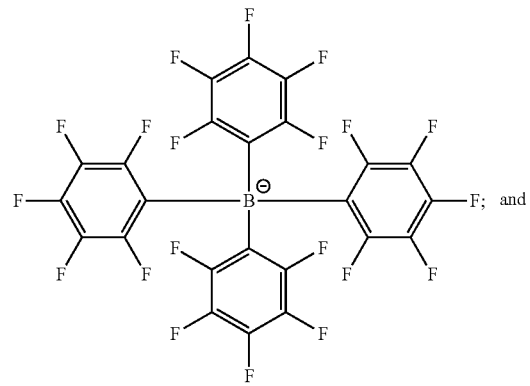
where $R_{35}$ and $R_{36}$ are the same or different and each independently selected from linear or branched $(C_{10}-C_{13})$alkyl

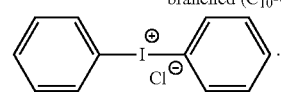
diphenyliodonium chloride

19. The kit according to claim 16, which contains a mixture selected from the group consisting of:
component A containing a mixture of 5-phenethylbicyclo[2.2.1]hept-2-ene, diethylphenyl)-3,3,5,5-tetramethylpyrrolidin-2-ylidene-triisopropylphosphine ruthenium carbide dichloride and 1-chloro-4-propoxy-9H-thioxanthen-9-one, and component B containing tolylcumyliodonium-tetrakis pentafluorophenylborate and toluene;
component A containing a mixture of 5-phenethylbicyclo[2.2.1]hept-2-ene, diisopropylphenyl)-3,3,5,5-tetramethylpyrrolidin-2-ylidene-triisopropylphosphine ruthenium carbide dichloride and 1-chloro-4-propoxy-9H-thioxanthen-9-one, and component B containing tolylcumyliodonium-tetrakis pentafluorophenylborate and toluene;
component A containing a mixture of 5-phenethylbicyclo[2.2.1]hept-2-ene, dicyclopentadiene, 1-(2,6-diethylphenyl)-3,3,5,5-tetramethylpyrrolidin-2-ylidene-triisopropylphosphine ruthenium carbide dichloride and 1-chloro-4-propoxy-9H-thioxanthen-9-one, and component B containing a mixture of 5-(2-([1,1'-biphenyl]-2-yloxy)ethyl)bicyclo[2.2.1]hept-2-ene and tolylcumyliodonium-tetrakis pentafluorophenylborate; and component A containing a mixture of 2-hexyl-1,2,3,4,4a,5,8,8a-octahydro-1,4:5, 8-dimethanonaphthalene, 3a,4,4a,5,8,8a,9,9a-octahydro-1H-4,9:5, 8-dimethanocyclopenta[b]naphthalene, 1-(2,6-diethylphenyl)-3,3,5,5-tetramethylpyrrolidin-2-ylidene-triisopropylphosphine ruthenium carbide dichloride and 4-isopropylthioxanthone, and component B containing a mixture of 2-hexyl-1,2,3,4,4a,5,8,8a-octahydro-1,4:5,8-dimethanonaphthalene, 3a,4,4a,5,8,8a,9,9a-octahydro-1H-4,9:5,8-dimethanocyclopenta[b]naphthalene and bis(4-decylphenyl)iodonium-tetrakis pentafluorophenylborate.

20. A three dimensional object comprising the composition of claim 1.

* * * * *